United States Patent [19]

Schmidl et al.

[11] Patent Number: 5,732,113

[45] Date of Patent: Mar. 24, 1998

[54] TIMING AND FREQUENCY SYNCHRONIZATION OF OFDM SIGNALS

[75] Inventors: Timothy M. Schmidl; Donald C. Cox, both of Stanford, Calif.

[73] Assignee: Stanford University, Stanford, Calif.

[21] Appl. No.: 666,237

[22] Filed: Jun. 20, 1996

[51] Int. Cl.$^6$ ........................................... H04L 7/00
[52] U.S. Cl. .............................. 375/355; 375/354
[58] Field of Search .............................. 375/354, 355; 370/206, 208

[56] References Cited

U.S. PATENT DOCUMENTS

| | | | |
|---|---|---|---|
| 5,166,924 | 11/1992 | Moose | 370/32.1 |
| 5,228,025 | 7/1993 | Le Floch et al | 370/20 |
| 5,406,551 | 4/1995 | Saito et al | 370/19 |
| 5,444,697 | 8/1995 | Leung et al | 370/19 |
| 5,471,464 | 11/1995 | Ikeda | 370/19 |
| 5,506,836 | 4/1996 | Ikeda et al. | 370/19 |
| 5,521,943 | 5/1996 | Dambacher | 375/295 |
| 5,550,812 | 8/1996 | Phillips | 370/19 |
| 5,555,268 | 9/1996 | Fattouche et al | 375/206 |
| 5,602,835 | 2/1997 | Seki et al | 370/206 |

*Primary Examiner*—Stephen Chin
*Assistant Examiner*—Mohammad Ghayow
*Attorney, Agent, or Firm*—Lumen Intellectual Property Services

[57] ABSTRACT

A method and apparatus achieves rapid timing synchronization, carrier frequency synchronization, and sampling rate synchronization of a receiver to an orthogonal frequency division multiplexed (OFDM) signal. The method uses two OFDM training symbols to obtain full synchronization in less than two data frames. A first OFDM training symbol has only even-numbered sub-carriers, and substantially no odd-numbered sub-carriers, an arrangement that results in half-symbol symmetry. A second OFDM training symbol has even-numbered sub-carriers differentially modulated relative to those of the first OFDM training symbol by a predetermined sequence. Synchronization is achieved by computing metrics which utilize the unique properties of these two OFDM training symbols. Timing synchronization is determined by computing a timing metric which recognizes the half-symbol symmetry of the first OPDM training symbol. Carrier frequency offset estimation is performed in using the timing metric as well as a carrier frequency offset metric which peaks at the correct value of carrier frequency offset. Sampling rate offset estimation is performed by evaluating the slope of the locus of points of phase rotation due to sampling rate offset as a function of sub-carrier frequency number.

26 Claims, 15 Drawing Sheets

| Frequency Number, k | $C_{1,k}$ | $C_{2,k}$ | $V_k = \sqrt{2}\,\dfrac{C_{2,k}}{C_{1,k}}$ |
|---|---|---|---|
| -4 | 7+7j | 5-5j | -j |
| -3 | 0 | -5-5j | |
| -2 | -7+7j | -5-5j | j |
| -1 | 0 | -5+5j | |
| 0 | 0 | 0 | |
| 1 | 0 | 5+5j | |
| 2 | 7-7j | -5+5j | -1 |
| 3 | 0 | 5-5j | |
| 4 | 7+7j | 5+5j | 1 |

FIG. 8

| Frequency Number | Transmitted Data Configuration | Received Data Configuration | Configuration After Partial/ Fractional Correction | Configuration After Full Correction |
|---|---|---|---|---|
| -5 | | | | |
| -4 | | | | |
| -3 | | | | |
| -2 | Data[-2] | Data[-2] | Data[-2] | Data[-2] |
| -1 | Data[-1] | Data[-1] | Data[-1] | Data[-1] |
| 0 | Data[0] | Data[0] | Data[0] | Data[0] |
| 1 | Data[1] | Data[1] | Data[1] | Data[1] |
| 2 | Data[2] | Data[2] | Data[2] . | Data[2] |
| 3 | | | | |

FIG. 12

TIMING AND FREQUENCY SYNCHRONIZATION OF OFDM SIGNALS

FIELD OF THE INVENTION

The present invention relates to a method and apparatus for the reception of orthogonal frequency division multiplexed (OFDM) signals. More particularly, the invention concerns timing and frequency synchronization of an OFDM receiver to an OFDM signal to enable the OFDM receiver to accurately demodulate, decode, and recover data transmitted across an OFDM channel on the OFDM sub-carriers of the OFDM signal.

BACKGROUND OF THE INVENTION

1. General Description of Transmission Using OFDM

Orthogonal frequency division multiplexing (OFDM) is a robust technique for efficiently transmitting data over a channel. The technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier. Additionally, OFDM is much less susceptible to data loss due to multipath fading than other conventional approaches for data transmission because inter-symbol interference is prevented through the use of OFDM symbols that are long in comparison to the length of the channel impulse response. Also, the coding of data onto the OFDM sub-carriers can take advantage of frequency diversity to mitigate loss due to frequency-selective fading.

The general principles of OFDM signal transmission can be described with reference to FIG. 1 which is a block diagram of a typical OFDM transmitter according to the prior art. An OFDM transmitter 10 receives a stream of baseband data bits 12 as its input. These input data bits 12 are immediately fed into an encoder 14, which takes these data bits 12 in segments of B bits every $T_g+T_s$ seconds, where $T_s$ is an OFDM symbol interval and $T_g$ is a cyclic prefix or guard interval. Encoder 14 typically uses a block and/or convolutional coding scheme to introduce error-correcting and/or error-detecting redundancy into the segment of B bits and then sub-divides the coded bits into 2N sub-segments of m bits. The integer m typically ranges from 2 to 6.

In a typical OFDM transmission system, there are 2N+1 OFDM sub-carriers, including the zero frequency DC sub-carrier which is not generally used to transmit data since it has no frequency and therefore no phase. Accordingly, encoder 14 then typically performs $2^m$-ary quadrature amplitude modulation (QAM) encoding of the 2N sub-segments of m bits in order to map the sub-segments of m bits to predetermined corresponding complex-valued points in a $2^m$-ary constellation. Each complex-valued point in the constellation represents discrete values of phase and amplitude. In this way, encoder 14 assigns to each of the 2N sub-segments of m bits a corresponding complex-valued $2^m$-ary QAM sub-symbol $c_k=a_k+jb_k$, where $-N \leq k \leq N$, in order to create a sequence of frequency-domain sub-symbols that encodes the B data bits. Also, the zero-frequency sub-carrier is typically assigned $c_0=0$. Encoder 14 then passes the sequence of sub-symbols, along with any additional zeroes that may be required for interpolation to simplify filtering, onto an inverse discrete Fourier transformer (IDFT) or, preferably, an inverse fast Fourier transformer (IFFT) 16.

Upon receiving the sequence of OFDM frequency-domain sub-symbols from encoder 14, IFFT 16 performs an inverse fast Fourier transform on the sequence of sub-symbols. In other words, it uses each of the complex-valued sub-symbols, $c_k$, to modulate the phase and amplitude of a corresponding one of 2N+1 sub-carrier frequencies over a symbol interval $T_s$. The sub-carriers are given by $e^{-2\pi j f_k t}$, and therefore, have baseband frequencies of $f_k=k/T_s$, where k is the frequency number and is an integer in the range $-N \leq k \leq N$. IFFT 16 thereby produces a digital time-domain OFDM symbol of duration $T_s$ given by:

$$u(t) = \sum_{k=-N}^{N} c_k \exp(-2\pi j f_k t) \quad (1)$$

$$0 \leq t \leq T_s$$

As a result of this discrete-valued modulation of the OFDM sub-carriers by frequency-domain sub-symbols over symbol intervals of $T_s$ seconds, the OFDM sub-carriers each display a sinc $x=(\sin x)/x$ spectrum in the frequency domain. By spacing each of the 2N+1 sub-carriers $1/T_s$ apart in the frequency domain, the primary peak of each sub-carrier's sinc x spectrum coincides with a null of the spectrum of every other sub-carrier. In this way, although the spectra of the sub-carriers overlap, they remain orthogonal to one another. FIG. 2 illustrates the arrangement of the OFDM sub-carriers as well as the envelope of their modulated spectra within an OFDM channel bandwidth, BW, centered around a carrier frequency, $f_{cr}$. Note that the modulated sub-carriers fill the channel bandwidth very efficiently.

Returning to FIG. 1, the digital time-domain OFDM symbols produced by IFFT 16 are then passed to a digital signal processor (DSP) 18. DSP 18 performs additional spectral shaping on the digital time-domain OFDM symbols and also adds a cyclic prefix or guard interval of length $T_g$ to each symbol. The cyclic prefix is generally just a repetition of part of the symbol. This cyclic prefix is typically longer than the OFDM channel impulse response and, therefore, acts to prevent inter-symbol interference (ISI) between consecutive symbols.

The real and imaginary-valued digital components that make up the cyclically extended, spectrally-shaped digital time-domain OFDM symbols are then passed to digital-to-analog converters (DACs) 20 and 22, respectively. DACs 20 and 22 convert the real and imaginary-valued digital components of the time-domain OFDM symbols into in-phase and quadrature OFDM analog signals, respectively, at a conversion or sampling rate $f_{ck\_s}$ as determined by a clock circuit 24. The in-phase and quadrature OFDM signals are then passed to mixers 26 and 28, respectively.

In mixers 26 and 28, the in-phase and quadrature OFDM signals from DACs 20 and 22 are used to modulate an in-phase intermediate frequency (IF) signal and a 90° phase-shifted (quadrature) IF signal, respectively, in order to produce an in-phase IF OFDM signal and a quadrature IF OFDM signal, respectively. The in-phase IF signal that is fed to mixer 26 is produced directly by a local oscillator 30, while the 90° phase-shifted IF signal that is fed to mixer 28 is produced by passing the in-phase IF signal produced by local oscillator 30 through a 90° phase-shifter 32 before feeding it to mixer 28. These two in-phase and quadrature IF OFDM signals are then combined in combiner 34 to form a composite IF OFDM signal. In some prior art transmitters, the IF mixing is performed in the digital domain using a digital synthesizer and digital mixers before the digital-to-analog conversion is performed.

This composite IF OFDM signal is then passed into radio frequency (RF) transmitter 40. Many variations of RF transmitter 40 exist and are well known in the art, but typically, RF transmitter 40 includes an IF bandpass filter 42, an RF mixer 44, an RF carrier frequency local oscillator 46, an RF bandpass filter 48, an RF power amplifier 50, and an antenna 52. RF transmitter 40 takes the IF OFDM signal from combiner 34 and uses it to modulate a transmit carrier of frequency $f_{ct}$, generated by RF local oscillator 46, in order to produce an RP OFDM-modulated carrier that occupies a channel bandwidth, BM. Because the entire OFDM signal must fit within this channel bandwidth, the channel bandwidth must be at least $(1/T_s)\cdot(2N+1)$ Hz wide to accommodate all the modulated OFDM sub-carriers. The frequency-domain characteristics of this RF OFDM-modulated carrier are illustrated in FIG. 2. This RF OFDM-modulated carrier is then transmitted from antenna 52 through a channel, to an OPDM receiver in a remote location. In alternative embodiments of RF transmitter 40, the OFDM signal is used to modulate the transmit carrier using frequency modulation (FH), single-sideband modulation (SSB), or other modulation techniques. Therefore, the resulting RP OFDM-modulated carrier may not necessarily have the exact shape of the RP OPDM-modulated carrier illustrated in FIG. 2 (i.e. the RF OPDM-modulated carrier might not be centered around the transmit carrier, but instead may lie to either side of it).

In order to receive the OFDM signal and to recover the baseband data bits that have been encoded into the OFDH sub-carriers at a remote location, an OFDM receiver must perform essentially the inverse of all the operations performed by the OFDM transmitter described above. These operations can be described with reference to FIG. 3 which is a block diagram of a typical OPDM receiver according to the prior art.

The first element of a typical OFDM receiver 60 is an RF receiver 70. Like RF transmitter 40, many variations of RF receiver 70 exist and are well known in the art, but typically, RF receiver 70 includes an antenna 72, a low noise amplifier (LNA) 74, an RF bandpass filter 76, an automatic gain control (AGC) circuit 77, an RF mixer 78, an RF carrier frequency local oscillator 80, and an IF bandpass filter 82.

Through antenna 72, RF receiver 70 couples in the RF OFDM-modulated carrier after it passes through the channel. Then, by mixing it with a receive carrier of frequency $f_{cr}$ generated by RF local oscillator 80, RF receiver 70 downconverts the RF OFDM-modulated carrier to obtain a received IF OFDM signal. The frequency difference between the receive carrier and the transmit carrier contributes to the carrier frequency offset, $\Delta f_c$.

This received IF OFDM signal then feeds into both mixer 84 and mixer 86 to be mixed with an in-phase IF signal and a 90° phase-shifted (quadrature) IF signal, respectively, to produce in-phase and quadrature OFDM signals, respectively. The in-phase IF signal that feeds into mixer 84 is produced by an IF local oscillator 88. The 90° phase-shifted IF signal that feeds into mixer 86 is derived from the in-phase IF signal of IF local oscillator 88 by passing the in-phase IF signal through a 90° phase shifter 90 before feeding it to mixer 86.

The in-phase and quadrature OFDM signals then pass into analog-to-digital converters (ADCs) 92 and 93, respectively, where they are digitized at a sampling rate $f_{ck\_r}$ as determined by a clock circuit 94. ADCs 92 and 93 produce digital samples that form an in-phase and a quadrature discrete-time OFDM signal, respectively. The difference between the sampling rates of the receiver and that of the transmitter is the sampling rate offset, $\Delta f_{ck} = f_{ck\_r} - f_{ck\_t}$ The unfiltered in-phase and quadrature discrete-time OFDM signals from ADCs 92 and 93 then pass through digital low-pass filters 96 and 98, respectively. The output of lowpass digital filters 96 and 98 are filtered in-phase and quadrature samples, respectively, of the received OFDM signal. In this way, the received OFDM signal is converted into in-phase ($q_i$) and quadrature ($p_i$) samples that represent the real and imaginary-valued components, respectively, of the complex-valued OFDM signal, $r_i = q_i + jp_i$. These in-phase and quadrature (real-valued and imaginary-valued) samples of the received OFDM signal are then delivered to DSP 100. Note that in some prior art implementations of receiver 60, the analog-to-digital conversion is done before the IF mixing process. In such an implementation, the mixing process involves the use of digital mixers and a digital frequency synthesizer. Also note that in many prior art implementations of receiver 60, the digital-to-analog conversion is performed after the filtering.

DSP 100 performs a variety of operations on the in-phase and quadrature samples of the received OFDM signal. These operations may include: a).synchronizing receiver 60 to the timing of the symbols and data frames within the received OFDM signal, b) estimating and correcting for the carrier frequency offset $\Delta f_c$, of the received OFDM signal, c) removing the cyclic prefixes from the received OFDM signal, d) computing the discrete Fourier transform (DFT) or preferably the fast Fourier transform (FFT) of the received OFDM signal in order to recover the sequences of frequency-domain sub-symbols that were used to modulate the sub-carriers during each OFDM symbol interval, and e) performing any required channel equalization on the sub-carriers. In some implementations, DSP 100 also estimates and corrects the sampling rate offset, $\Delta f_{ck}$. Finally, DSP 100 computes a sequence of frequency-domain sub-symbols, $y_k$, from each symbol of the OFDM signal by demodulating the sub-carriers of the OFDM signal by means of the FFT calculation. DSP 100 then delivers these sequences of sub-symbols to a decoder 102.

Decoder 102 recovers the transmitted data bits from the sequences of frequency-domain sub-symbols that are delivered to it from DSP 100. This recovery is performed by decoding the frequency-domain sub-symbols to obtain a stream of data bits 104 which should ideally match the stream of data bits 12 that were fed into the OFDM transmitter 10. This decoding process can include soft Viterbi decoding and/or Reed-Solomon decoding, for example, to recover the data from the block and/or convolutionally encoded sub-symbols.

In a typical OFDM data transmission system such as one for implementing digital television or a wireless local area network (WLAN), data is transmitted in the OFDM signal in groups of symbols known as data frames. This prior art concept is shown in FIG. 4 where a data frame 100 includes M consecutive symbols 112a, 112b, . . . , 112M, each of which includes a guard interval, $T_g$, as well as the OFDM symbol interval, $T_s$. Therefore, each symbol has a total duration of $T_g + T_s$ seconds. Depending on the application, data frames can be transmitted continuously, such as in the broadcast of digital TV, or data frames can be transmitted at random times in bursts, such as in the implementation of a WLAN.

The transmission of data through a channel via an OFDM signals provides several advantages over more conventional transmission techniques. These advantages include:

a) Tolerance to multipath delay spread. This tolerance is due to the relatively long symbol interval $T_s$ compared to the typical time duration of the channel impulse response. These long symbol intervals prevent inter-symbol interference (ISI).

b) Tolerance to frequency selective fading. By including redundancy in the OFDM signal, data encoded onto fading sub-carriers can be reconstructed from the data recovered from the other sub-carriers.

c) Efficient spectrum usage. Since OFDM sub-carriers are placed in very close proximity to one another without the need to leave unused frequency space between them, OFDM can efficiently fill a channel.

d) Simplified sub-channel equalization. OFDM shifts channel equalization from the time domain (as in single carrier transmission systems) to the frequency domain where a bank of simple one-tap equalizers can individually adjust for the phase and amplitude distortion of each sub-channel.

e) Good interference properties. It is possible to modify the OFDM spectrum to account for the distribution of power of an interfering signal. Also, it is possible to reduce out-of-band interference by avoiding the use of OFDM sub-carriers near the channel bandwidth edges.

Although OFDM exhibits these advantages, prior art implementations of OFDM also exhibit several difficulties and practical limitations. The most important difficulty with implementing OFDM transmission systems is that of achieving timing and frequency synchronization between the transmitter and the receiver. There are three aspects of synchronization that require careful attention for the proper reception of OFDM signals.

First, in order to properly receive an OFDM signal that has been transmitted across a channel and demodulate the symbols from the received signal, an OFDM receiver must determine the exact timing of the beginning of each symbol within a data frame. If correct timing is not known, the receiver will not be able to reliably remove the cyclic prefixes and correctly isolate individual symbols before computing the FFT of their samples. In this case, sequences of sub-symbols demodulated from the OFDM signal will generally be incorrect, and the transmitted data bits will not be accurately recovered.

Equally important but perhaps more difficult than achieving proper symbol timing is the issue of determining and correcting for carrier frequency offset, the second major aspect of OFDM synchronization. Ideally, the receive carrier frequency, $f_{cr}$, should exactly match the transmit carrier frequency, $f_{ct}$. If this condition is not met, however, the mis-match contributes to a non-zero carrier frequency offset, $\Delta f_c$, in the received OFDM signal. OFDM signals are very susceptible to such carrier frequency offset which causes a loss of orthogonality between the OFDM sub-carriers and results in inter-carrier interference (ICI) and a severe increase in the bit error rate (BER) of the recovered data at the receiver.

The third synchronization issue of concern when implementing an OFDM communication system is that of synchronizing the transmitter's sample rate to the receiver's sample rate to eliminate sampling rate offset. Any mis-match between these two sampling rates results in a rotation of the $2^m$-ary sub-symbol constellation from symbol to symbol in a frame. Although correcting for sampling rate offset is less of a problem than that of determining symbol timing and correcting carrier frequency offset, uncorrected sampling frequency offset can contribute to increased BER.

DESCRIPTION OF THE PRIOR ART

In order to solve the above-mentioned synchronization problems associated with the proper reception OFDM signals, several synchronization and correction techniques have been previously suggested and developed.

In U.S. Pat. No. 5,444,697, Leung et al. suggest a technique for achieving timing synchronization of a receiver to an OFDM signal on a frame-by-frame basis. The method, however, requires that a plurality of the OFDM sub-carriers be reserved exclusively for data synchronization, thus reducing the number of sub-carriers used for encoding and transmitting data. Furthermore, Leung does not suggest a technique for correcting the carrier frequency offset or sampling rate offset. Finally, Leung's technique requires a loop-back to determine the phase and amplitude of each sub-channel, thereby rendering the technique unsuitable for broadcast applications such as digital TV.

In U.S. Pat. No. 5,345,440, Gledhill et al. present a method for improved demodulation of OFDM signals in which the sub-carriers are modulated with values from a quadrature phase shift keying (QPSK) constellation. However, the disclosure does not teach a reliable way to estimate the symbol timing. Instead, assuming approximate timing is already known, it suggests taking an FFT of the OFDM signal samples and measuring the spread of the resulting data points to suggest the degree of timing synchronization. This technique, however, requires a very long time to synchronize to the OFDM signal since there is an FFT in the timing synchronization loop. Also, their method for correcting for carrier frequency offset assumes that timing synchronization is already known. Furthermore, the achievable carrier offset acquisition range is limited to half a sub-channel bandwidth. This very limited range for carrier offset correction is insufficient for applications such as digital television where carrier frequency offsets are likely to be as much as several tens of sub-carrier bandwidths. Finally, the disclosure does not teach a method for correcting for sampling rate offset.

In U.S. Pat. No. 5,313,169, Fouche et al. suggest a method for estimating and correcting for the carrier frequency offset and s sampling rate offset of a receiver receiving an OFDM signal. The method requires the inclusion of two additional pilot frequencies within the channel bandwidth. The success of this method is limited because these pilot carriers are susceptible to multipath fading. Furthermore, Fouche et al. do not suggest a reliable method for determining symbol timing. They discuss subtracting the cyclic prefix from each symbol and then trying to find where there is a cancellation, but such a cancellation will not occur in the presence of carrier frequency offset. Also, because their synchronization loop includes a computationally complex FFT, synchronization takes a long time. Additionally, because the method does not correct for carrier frequency offset before taking the FFTs, the method will suffer from inter-carrier interference between the sub-carriers, thus limiting its performance. Finally, the method also has a limited acquisition range for the carrier frequency offset estimation.

In "A Technique for Orthogonal Frequency Division Multiplexing Frequency Offset Correction," *IEEE Transactions on Communications*, Vol. 42, No. 10, October 1994, pp. 2908–14; and in "Synchronization Algorithms for an OFDM System for Mobile Communications," *ITG-*

*Fachtagung* 130, Munich, Oct. 26–28, 1994, pp. 105–113, Moose and Classen, respectively, discuss two techniques for OFDM synchronization. Both methods involve the repetition of at least one symbol within an OFDM data free. Moose's method does not suggest a way to determine symbol timing while Classen's method requires searching for a cancellation of two identical symbols after correcting for the phase shift introduced by the carrier frequency offset. This technique requires the re-computation of a correction factor for every new set of samples and is, therefore, tremendously computationally complex. Furthermore, neither author suggests an effective technique for estimating carrier frequency offset greater than one half of a sub-channel bandwidth. Consequently, the methods would not be suitable to the reception of OFDM digital TV signals. Classen does suggest a trial-and-error method for estimating carrier frequency offsets greater than one half of a sub-channel bandwidth by searching in increments of 0.1 sub-channel bandwidths. Such a method, however, is very slow and computationally complex, especially for offsets of several sub-carrier bandwidths.

OBJECTS AND ADVANTAGES

It is an object of the present invention to overcome many of the short-comings of the above-mentioned prior art synchronization techniques. In particular, it is an object of the invention to provide a robust and computationally simple method for synchronizing a receiver to an OFDM signal which provides fast and accurate estimates of symbol timing, carrier frequency offset, and sampling rate offset, typically within the time duration of one data frame. It is a further object of the invention to provide a method that operates effectively with minimal overhead to the OFDM signal and does not require the use of additional hardware for generating and transmitting additional synchronization carrier frequencies, as is required by some of the prior art methods.

It is another object to provide a method for carrier frequency offset estimation that is not limited to a finite range and that can determine offsets of many sub-channel bandwidths. Also, it is an object to provide such a method that avoids the use of an FFT in the timing synchronization estimate, thereby allowing very quick determination of the correct timing point. It is a further object of the present invention to require only two FFTs during carrier frequency synchronization while still avoiding ICI. Finally, it is an object of the present invention to provide a low-complexity technique for tracking successive data frames in order to maintain synchronization indefinitely following the initial acquisition procedure.

Accordingly, it is an object of the present invention to provide a robust, low-overhead, low-complexity method and apparatus for the rapid acquisition and synchronization of an OFDM signal at an OFDM receiver. Specifically, several other objects of the present invention include:

a) to provide a method for rapidly acquiring the symbol and frame timing of an OFDM signal, preferably within less than the time interval of two data frames, thereby allowing reception of the OFDM symbols transmitted in either continuous or burst data frames;

b) to provide a method for rapidly estimating and correcting for the carrier frequency offset of an OFDM receiver, preferably within less than the time interval of two data frames, thereby allowing reception and demodulation of the OFDM symbols in a burst data frame without loss of orthogonality and a corresponding increase in BER;

c) to provide a method for rapidly estimating and correcting for the sampling rate offset of an OFDM receiver, thereby allowing reception and demodulation of the OFDM symbols in a burst frame with minimized BER;

d) to provide a method for continuously tracking the symbol and frame timing of an OFDM signal consisting of continuously transmitted data frames;

e) to provide a method for continuously tracking and correcting for the carrier frequency offset of an OFDM receiver thereby allowing continuous reception of an OFDM signal without loss of orthogonality between the sub-carriers and an corresponding increase in BER;

f) to provide a method for continuously tracking and correcting the sampling rate offset of an OFDM receiver;

g) to provide a low-complexity method and apparatus for all the above that requires relatively little computation;

h) to provide a robust method and apparatus for all the above that works well even in a fading channel by averaging over many or all of the sub-carriers in the OFDM channel, and i) to provide a method and apparatus for all the above that is not restricted to OFDM signals in which the sub-carriers are modulated solely by values from a QPSK constellation.

SUMMARY OF THE INVENTION

The present invention provides a robust, low complexity, low overhead method and apparatus for attaining rapid synchronization of a receiver to an OFDM signal, including symbol/frame timing synchronization, carrier frequency synchronization, and sampling rate synchronization. By avoiding the use of additional, discrete synchronization carriers and instead using two special OFDM training symbols for synchronization and by averaging over many of the sub-carriers, the method of the present invention is relatively insensitive to multipath fading.

Synchronization of a receiver to an OFDM signal according to the present invention relies on the detection and evaluation of the samples of two special OFDM training symbols that are placed into the OFDM signal, preferably at least once every frame. The first of these two training symbols exhibits half-symbol symmetry in the time-domain, i.e. the first half of the symbol is identical to the second half.

In the preferred embodiment, the two halves of the first training symbol are made identical by modulating the even-numbered sub-carriers by a first predetermined pseudo-noise (PN) sequence of frequency-domain sub-symbols, while modulating the odd-numbered sub-carriers by zero. It will be obvious to one skilled in the art that the exchange of the roles of even and odd results in no substantial differences in the function of the present invention. Accordingly, without any loss of generality or any introduction of limitation, the preferred embodiment will be described using a training symbol with a PN sequence transmitted on even-numbered sub-carriers.

The second OPDM training symbol also comprises even-numbered sub-carriers, and these are modulated by a second predetermined pseudo-noise (PN) sequence of frequency-domain sub-symbols. This second PN sequence is chosen in order to produce a predetermined differentially modulated sequence, $v_k$, on the even-numbered sub-carriers of the second OFDM training symbol relative to the first OFDM training symbol. According to the present invention, the second OFDM training symbol is not required to have any particular specific modulation of the odd-numbered sub-carriers, but generally a third predetermined PN sequence is used to modulate these odd-numbered sub-carriers in order to perform channel estimation on these sub-carriers.

During signal acquisition, complex-valued samples of the received OFDM signal are continuously used to compute a symbol/frame timing metric, M(d), until the optimal timing point is determined. This timing metric detects the half-symbol symmetry of the first OFDM training symbol, i.e. the value of M(d) is maximized at an optimal timing point, $d_{opt}$, when $M(d_{opt})$ is computed using only samples from the first OFDM training symbol. By evaluating M(d) for successive samples of the OFDM signal, the optimal symbol/frame timing point is found when M(d) reaches a maximum, thus enabling timing synchronization. At this optimal timing point, all vector sums in M(d) line up in phase.

The phase φ of M(d) gives a partial measure of the carrier frequency offset, up to a maximum offset of $\pm 1/T_s$. Therefore, by computing φ, the complex-valued samples of the two training symbols can be corrected to remove this offset and avoid ICI.

The next step in the method of present invention is to take an FFT of the partially-corrected samples of the two training symbols to obtain two sequences of frequency-domain sub-symbols, $x_{1,k}$ and $x_{2,k}$. These sequences are then used along with the predetermined differentially modulated sequence, $v_k$, to calculate a carrier frequency offset metric, B(g), that is used to estimate the remaining carrier frequency offset. This remaining offset will be an even integer multiple of $1/T_s$. Now having determined an estimate for the entire carrier frequency offset, the receiver can be synchronized to eliminate this carrier frequency offset either by multiplying the error out from the samples or by re-adjusting one or more of the local oscillators in the receiver.

Having achieved an estimate for the entire carrier frequency offset, an estimate can be made for the sampling rate offset. The two sequences of frequency-domain symbols, $x_{1,k}$ and $x_{2,k}$, corresponding to the two OFDM training symbols are corrected to remove the remaining carrier frequency offset error. Then the differential modulation is removed from $x_{2,k}$, and the two corrected sequences are used to estimate the phase rotation of the first sub-carrier due to the sampling rate offset. Determining this phase rotation, an estimation for the sampling rate offset is made, and this offset can be removed by either mathematically correcting the samples of the OFDM signal, or by re-adjusting the sampling rate of the receiver's analog-to-digital converters.

Therefore, in three steps, the method of the present invention determines symbol/frame timing, carrier frequency offset, and sampling rate offset. The low complexity of this synchronization technique makes it ideal for applications such as digital TV which require fast acquisition of the signal so that the user does not have to wait a great deal of time for the image to appear on the screen. Typically, the method of the present invention can perform its full synchronization procedure within two data frame intervals. Additionally, the method of the present invention can be extended to maintain synchronization of the receiver to the OPDM signal in a tracking mode.

BRIEF DESCRIPTION OF THE DRAWINGS

Preferred embodiments of the method and apparatus of the present invention will be described with reference to the following drawings:

FIG. 8 is a table of sub-carrier modulation values for the training symbols according to the principles of the present invention for a hypothetical OFDM signal with 8 sub-carriers (−4 to 4 excluding DC) wherein the modulation values are chosen from a QPSK subset of a 64-QAM constellation;

FIG. 12 is an example illustration of the steps in the process of carrier frequency offset correction according to the present invention;

DETAILED DESCRIPTION OF THE PREFERRED EMBODIMENT

A description of the preferred embodiment of the present invention will now be discussed in detail. Many modifications to this preferred embodiment are possible without departing from the general spirit and scope of the present invention, and such modifications will be obvious to those skilled in the art.

In order to provide a clear and detailed description of the synchronizing methods of the present invention, the invention will be described with reference to a preferred embodiment for the reception of a digital television signal that is transmitted as an OFDM signal though a broadcast channel. The parameters for the OFDM digital TV system are taken from the European specification for digital TV, R. Schafer, "Terrestrial transmission of DTVB signals—The European specification", *International Broadcasting Convention*, no. 413, pp. 79–84, Sept. 14–18, 1995. The OPDM digital TV signal of the preferred embodiment has a symbol time interval of $T_s$=896 µs and contains 6785 sub-carriers (−3392 to 3392, N=3392) within a 7.57 MHz channel bandwidth, resulting in a sub-carrier frequency spacing of 1116 Hz. There is an additional guard interval of $T_g$=28 µs, and the OFDM signal is sampled at a clock rate of 8192 samples/ symbol or 9.14 million samples per second. Each data frame has 96 symbols for a total frame interval of 88.7 ms.

The present invention provides a method and apparatus for synchronizing a receiver to an OFDM signal in order to achieve rapid and accurate acquisition of the OFDM signal, whereby the data modulated onto the sub-carriers may be reliably recovered. The method provides for frame/symbol timing estimation and synchronization, frequency offset estimation and correction/synchronization, and sampling rate offset estimation and correction/synchronization. When applied to applications using OFDM signals that continuously convey successive data frames to a receiver, such as the broadcast of digital TV as in the preferred embodiment, the method of the present invention also provides for low-complexity OFDM signal tracking once acquisition and initial offset corrections are completed. It will be obvious to anyone skilled in the art that the method of the present invention can be directly applied to other applications, such as wireless local area networks (WLANs), which use burst transmission of single data frames. In such applications, only initial acquisition and correction, but not signal tracking, are required.

Figure 5:
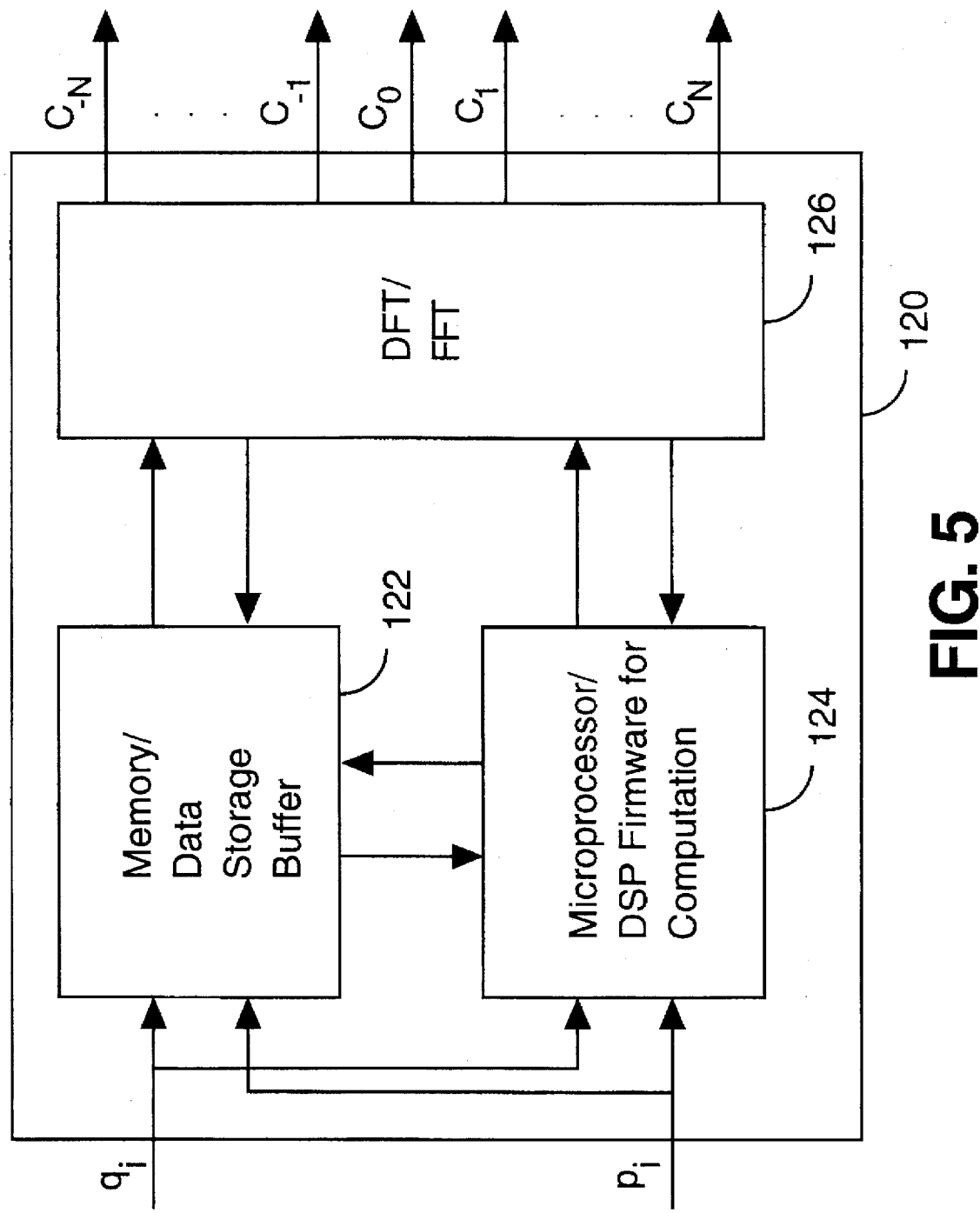
FIG. 5 is a block diagram of an apparatus according to the present invention for estimating symbol timing, carrier frequency offset, and sampling rate offset in order to synchronize a receiver to an OFDM signal.

An apparatus which implements the methods of the present invention for the preferred embodiment will also be presented and discussed in detail. This apparatus is shown in block diagram form in FIG. 5. Synchronization apparatus 120 is essentially a DSP system that takes the place of the prior art DSP 100 in OFDM receiver 60 of FIG. 3. Synchronization apparatus 120 includes a storage means 122, a computing means 124, and a means for computing an FFT 126. For the remainder of this discussion, we will assume that DSP 100 has been permanently replaced in FIG. 3 by synchronizing apparatus 120, which implements the methods of the present invention while continuing to perform the operations previously performed by DSP 100. These methods and the individual elements of synchronizing apparatus 120 that implement these methods will now be discussed.

1. The Training Sequence

Figure 6:
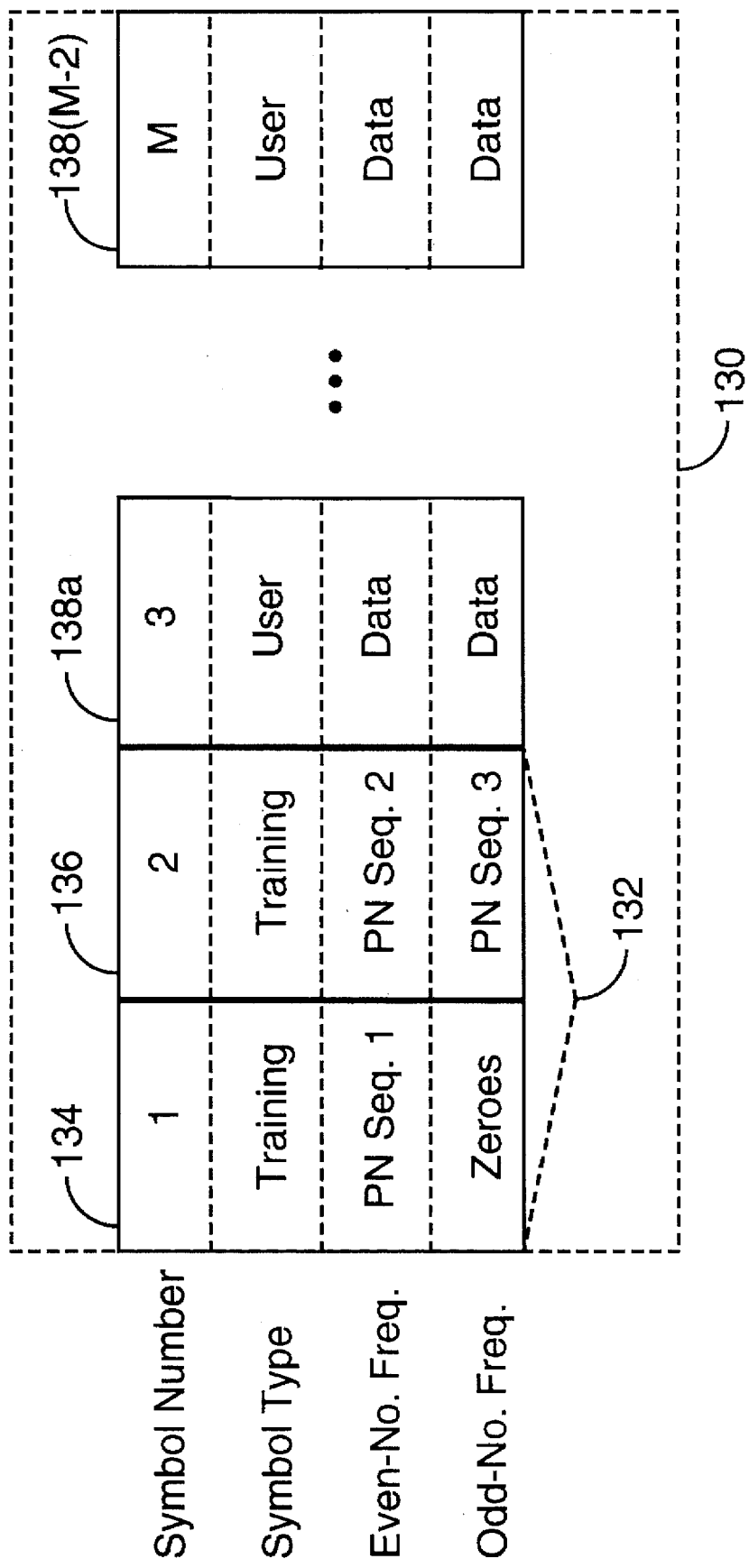
FIG. 6 illustrates the placement of a training sequence within a data frame and also illustrates the contents of the modulation sequences used to modulate the sub-carriers of an OFDM signal according to a preferred embodiment of the present invention.

The method of the present invention for timing and frequency synchronization of a receiver to an OFDM signal relies on the detection and analysis of a special OFDM training sequence that is included in the OFDM signal and preferably transmitted within a data frame. The format of this OFDM training sequence is an important aspect of the present invention, and an illustration of such an OFDM training sequence within a data frame is shown in FIG. 6. As shown in the figure, a data frame 130 includes an OFDM training sequence 132 that is composed of two successive OFDM symbols, a first OFDM training symbol 134 and a second OFDM training symbol 136. Alternatively, the training sequence can be packed into a single symbol comprising two mini-symbols having the properties of the first and second training symbols. Although these smaller mini-symbols result in simpler computations, their smaller size reduces the reliability and robustness of timing estimates. In addition, if there is no cyclic prefix before the second mini-symbol, there will be intersymbol interference between the mini-symbols. On the other hand, if there is a cyclic prefix, then the training symbol containing the two mini-symbols will be longer than the other data symbols. Accordingly, the preferred embodiment uses two separate training symbols.

Training symbols 134 and 136 are preferably placed at the beginning of data frame 130 as shown in the figure. However, this specific placement is not necessary. The training symbols could be placed elsewhere in the data frame; for example, they could be placed in the center of the frame in order to minimize time variations in the channel and the effect of the sampling rate offset over the frame interval. FIG. 6 also indicates the characteristics of the sequences used to modulate the even-numbered and odd-numbered sub-carriers for each symbol within data frame 130. These characteristics are described below in greater detail.

Because the OFDM transmitter 10 does not know when OFDM receiver 60 will begin to attempt to acquire the OFDM signal, it is preferred that training sequence 132 appear in every frame 130 transmitted by OFDM transmitter 10, or at least often enough that the OFDM receiver need not wait too long before it encounters an OFDM training sequence 132, which it needs to acquire and synchronize to the OFDM signal. For example, the training sequence should be transmitted often enough that a person changing channels in a digital TV system will not have to wait more than a second or two for the TV to tune into each channel.

If the OFDM training sequence 132 is transmitted with every frame 130 and there are a total of M symbols per frame 130, the overhead for the present invention is 2/M. Therefore, for the preferred embodiment of broadcast digital TV, the overhead is 2/96=2.08%. This is a relatively modest overhead, comparable or less than the overhead of previous methods for timing and frequency synchronization. Also, compared to prior art of synchronization techniques, the method of the present invention requires no dedicated sub-carriers as overhead.

First OFDM training symbol 134 is produced by suppressing the odd-numbered OFDM sub-carriers (i.e. using zeroes for modulation of these sub-carriers) during the symbol interval and simultaneously using a first predetermined pseudo-noise (PN) sequence to modulate the even-numbered sub-carriers during the symbol interval. This results in a time-domain OFDM symbol that has two identical halves since each of the even-numbered sub-carrier frequencies repeats every half symbol interval, and there are no odd-numbered sub-carrier frequencies to destroy this time-domain half-symbol symmetry. First OFDM training symbol 134 is therefore guaranteed to be unique within data frame 130 because all other symbols 136, 138$a$, 138$b$, ..., 138(M−2) will contain components from both odd-numbered and even-numbered sub-carriers and will, therefore, not be half-symbol symmetrical in the time domain.

Figure 7:
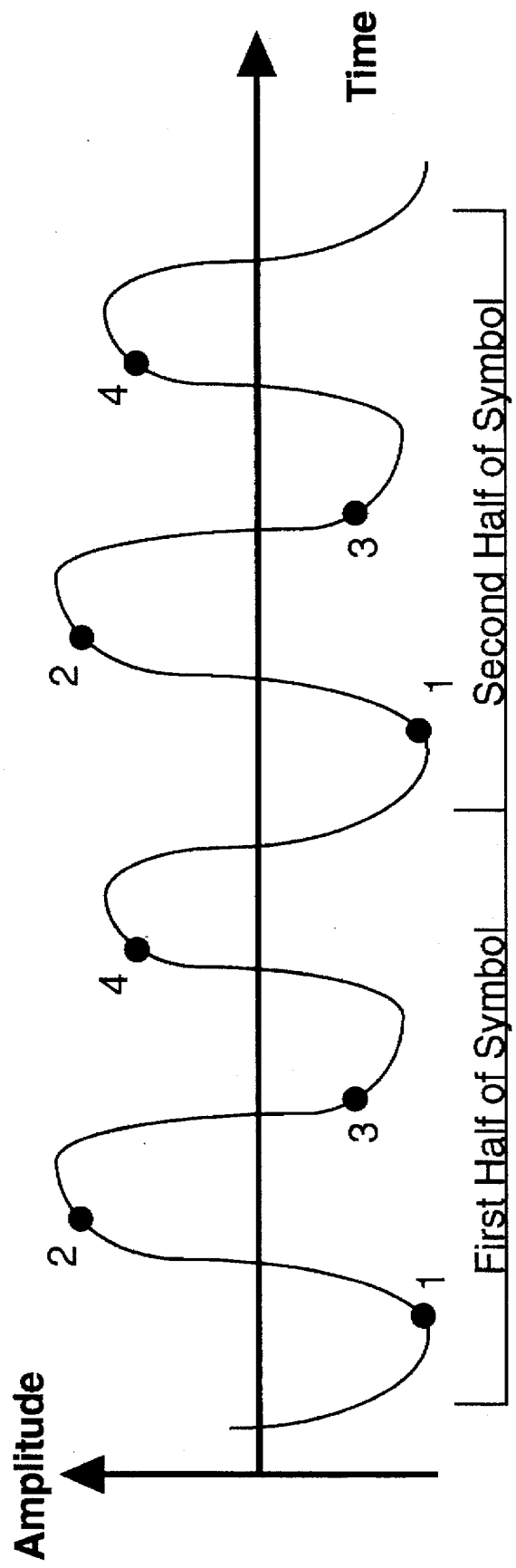
FIG. 7 is a time-domain plot of a possible first OFDM training symbol in accordance with the present invention.

FIG. 7 illustrates a possible first OFDM training symbol 134 in the time-domain. The two sets of dots numbered 1 through 4 represent corresponding samples taken by ADC 92 or ADC 93 during the first and second half of the symbol, respectively. Note that, as expected, the first half of the symbol is identical to the second half of the symbol. Furthermore, because this figure assumes there is no carrier frequency offset, $\Delta f_c$, the samples taken at the equivalent points on both halves of the symbol are identical. In other words, there is no phase shift between samples of the two halves of the symbol as would be expected if there were a carrier frequency offset.

In the preferred embodiment, in order to produce first OFDM training symbol 134, the values of the first predetermined PN sequence used to modulate the even-numbered carriers of this symbol are taken solely from points in a QPSK constellation while zeroes are assigned to modulate each of the odd-numbered sub-carriers. With this additional requirement of a QPSK constellation, since a $2^m$-ary QAM encoder 14 is used to create first OFDM training symbol 134, only a subset of the $2^m$ possible sub-symbols which form a QPSK constellation can be used to produce the first predetermined PN sequence for the even-numbered sub-carriers. The use of a QPSK constellation for the values of the first predetermined PN sequence is not required for proper operation of the method of the present invention, but such a choice does simplify the calculations performed by the preferred embodiment. When the values are chosen from a QPSK constellation, removing differential modulation by multiplying by the conjugate of the differential modulation, $v_k^*$, simply involves the swapping of real and imaginary components and/or the swapping of signs.

Additionally, in order to maintain an approximately constant signal power for each symbol in data frame 130 including first OFDM training symbol 134, the four points of the QPSK constellation used by the preferred embodiment for the first predetermined PN sequence are selected from a larger amplitude QPSK constellation within the 64-QAM constellation, so that points with higher energy can be used for the even-numbered sub-carriers of first OFDM training symbol 134. Alternatively, if a QPSK constellation of average power had been chosen for the first predetermined PN sequence, this sequence could have been multiplied by $\sqrt{2}$ at the OFDM transmitter 10 to compensate for the lack of power transmitted on the odd-numbered sub-carriers during this first OFDM training symbol 134.

The preferred embodiment also comprises a second OFDM training symbol 136, which in the preferred embodiment directly follows first OFDM training symbol 134. Although the two symbols need not be placed next to each other, doing so minimizes the effect of time variation of the channel over the duration of the training sequence. Conversely, separation of the two symbols will aid in the correction of sampling frequency offset.

Second OFDM training symbol 136 is produced by using a second predetermined PN sequence to modulate the even-numbered frequencies of this symbol during the symbol interval. This second predetermined PN sequence on the even-numbered frequencies is the only requirement on second OFDM training symbol 136 for proper operation. In the preferred embodiment, a third predetermined PN sequence is used to modulate the odd-numbered carriers of second OFDM training symbol 136. This third predetermined PN sequence is used for equalizing the odd-numbered sub-channels by enabling the receiver to measure the amplitude and phase distortion of each of these channels and thereby make the proper adjustments to compensate for the distortion.

FIG. 8 illustrates an example of the predetermined PN sequences used to create a training sequence according to the principles of the present invention. The figure shows the sub-symbol values, $c_{1,k}$ and $c_{2,k}$, for the two OFDM training symbols in a hypothetical training sequence for an OFDM signal with 8 sub-carriers (−4 to 4 excluding DC). The points chosen for the sub-symbol values are selected from a subset of a 64-QAM constellation according to the criteria discussed above for the preferred embodiment. FIG. 8 also shows the values for the predetermined differentially modulated sequence, $v_k$, on the even-numbered frequencies given by $v_k = \sqrt{2} \cdot c_{2,k} / c_{1,k}$.

2. Frame/Symbol Timing Synchronization

As described above, first OFDM training symbol 134 has two identical halves which remain identical after passing through the OFDM transmission channel, except that there will be a phase difference between them caused by the carrier frequency offset, $\Delta f_c$. To estimate symbol/frame timing in order to synchronize the receiver to the OFDM signal, the method of the present invention utilizes the time-domain symmetry properties of first OFDM training symbol 134. Specifically, symbol/frame timing according to the present invention requires the computation of a timing metric M(d) whose value at the correct timing point, due to the time-domain half-symbol symmetry of first OFDM training symbol 134, is much greater than its value at an incorrect timing point.

Figure 1:
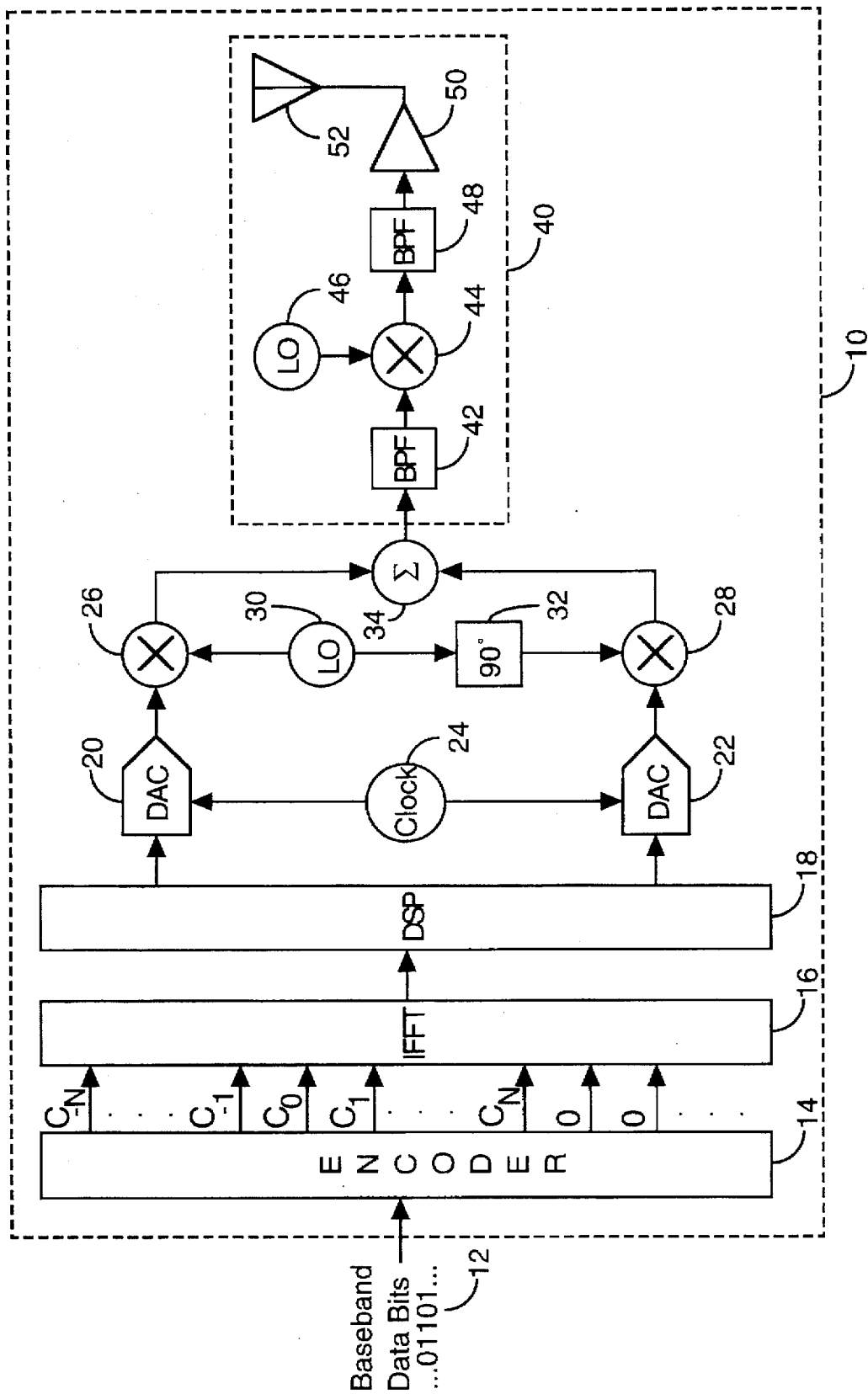
FIG. 1 is a block diagram of a typical OFDM transmitter according to the prior art.
Figure 2:
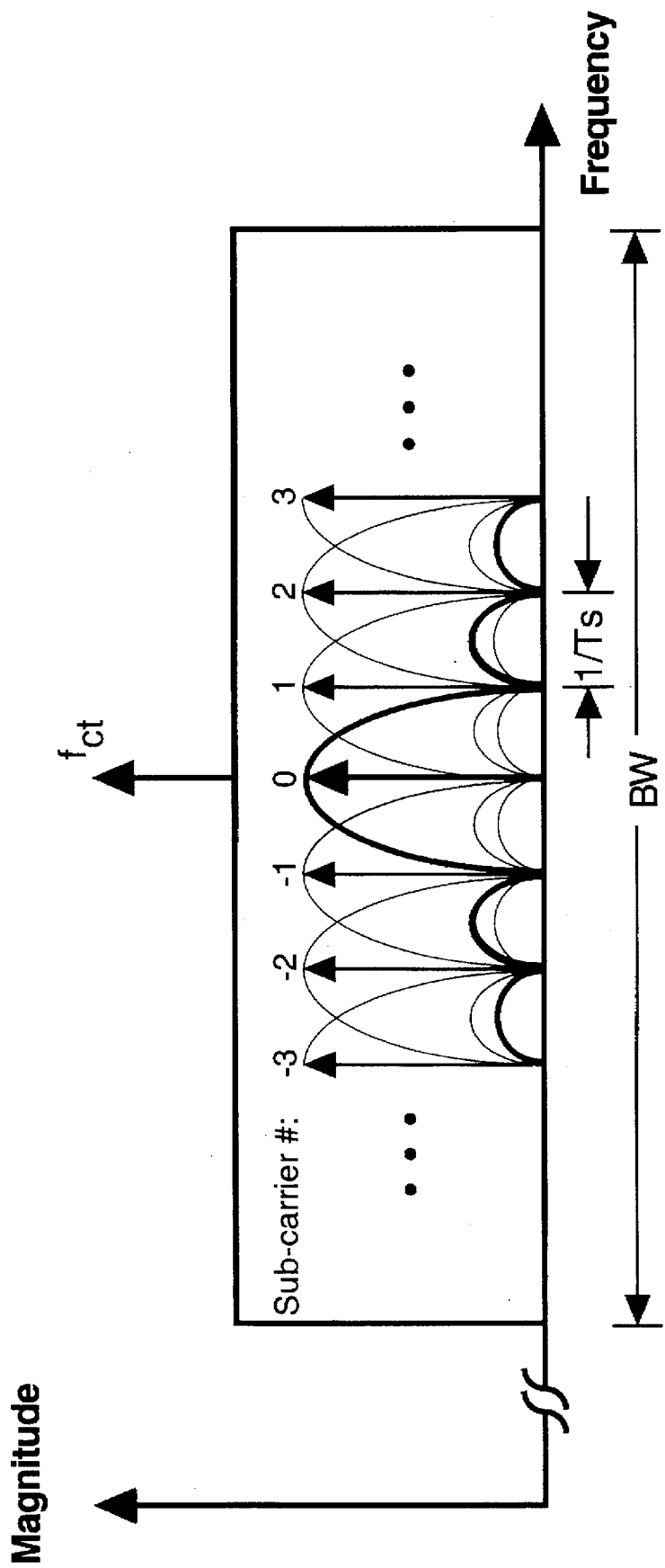
FIG. 2 is an illustration of a typical OFDM signal within an OFDM channel bandwidth showing the frequency domain positioning of OFDM sub-carriers and their modulated spectra, according to the prior art.
Figure 3:
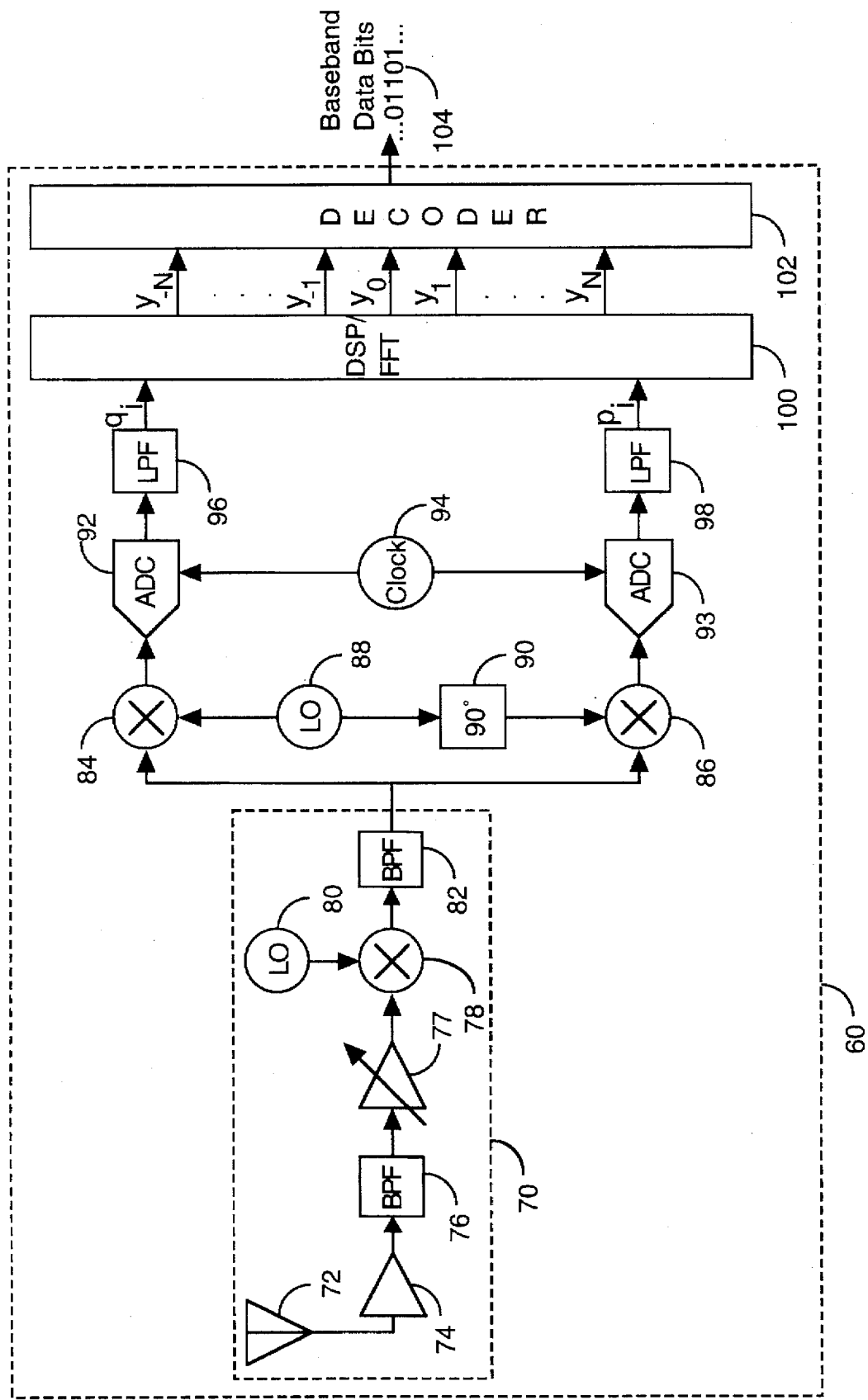
FIG. 3 is a block diagram of a typical OFDM receiver according to the prior art.
Figure 4:
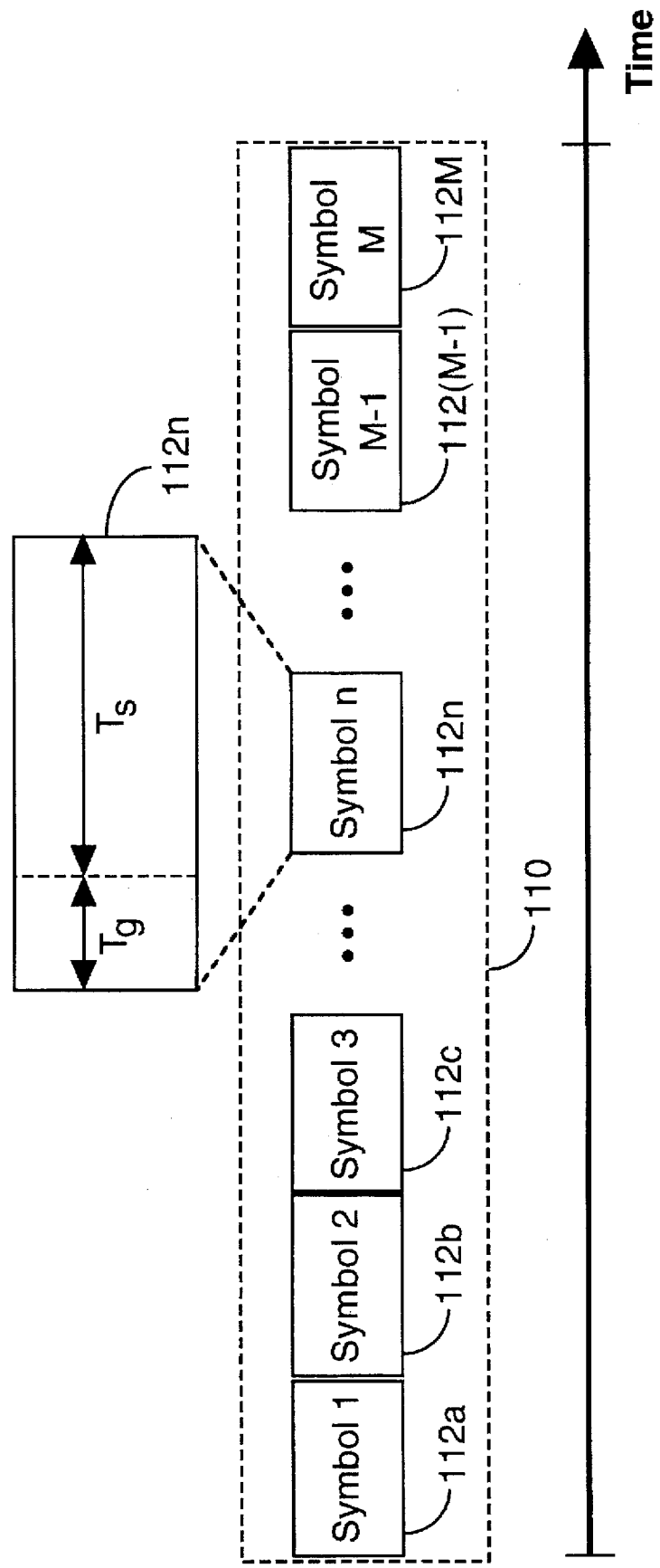
FIG. 4 illustrates a typical arrangement of OFDM symbols and their corresponding guard intervals within a data frame according to the prior art.

One of the key advantages of the present invention over the prior art is that it enables a receiver to accurately synchronize to the symbol/frame timing of an OFDM signal with the reception of just one symbol, first OFDM training symbol 134. Additionally, establishing timing synchronization by evaluating the samples of first OFDM training symbol 134 according to the present invention works well even for nearby OFDM signal sources transmitting bursts of OPDM signals. Such large signals may nearly saturate the ADCs of the receiver and result in very coarse quantization of the OFDM signal. The method of the present invention using first OFDM training symbol 134 for timing synchronization works well even in such a case, where prior art approaches would fail. The method relies only on the half-symbol symmetry of first OFDM training symbol 134, not on its amplitude characteristics. A detailed description of the method of the present invention for performing symbol and frame timing estimation is as follows:

Consider the complex-valued samples $r_i = p_i + jq_i$ of the OFDM signal that are delivered to DSP 100 in FIG. 3. Now let L be the number of complex samples in one half of an OFDM symbol. If the conjugate, $r_i^*$, of a sample from the first half of first OFDM training symbol 134 is multiplied by the corresponding sample from the second half, $r_{i+L}$, of first OFDM training symbol 134 which arrives $T_s/2$ seconds later, the distorting effects of the channel should cancel, and the resulting vector will have a phase of approximately $\phi = \pi \cdot T_s \cdot \Delta f_c$. By contrast, in general if the complex conjugate $r_i^*$ of a sample from a random location in data frame 130 is multiplied by the sample $r_{i+L}$ that succeeds it by L samples, or $T_s/2$ seconds, the resulting vector will have a random phase.

Now suppose we calculate a sum of vector products according to the equation:

$$P(d) = \sum_{i=0}^{L-1} (r^*_{d+i} r_{d+i+L}) \qquad (2)$$

where d is the timing point index. The equation can also be calculated using the iterative formula:

$$P(d+1) = P(d) + (r^*_{d+L} r_{d+2L}) - (r^*_d r_{d+L}). \qquad (3)$$

Figure 9B:
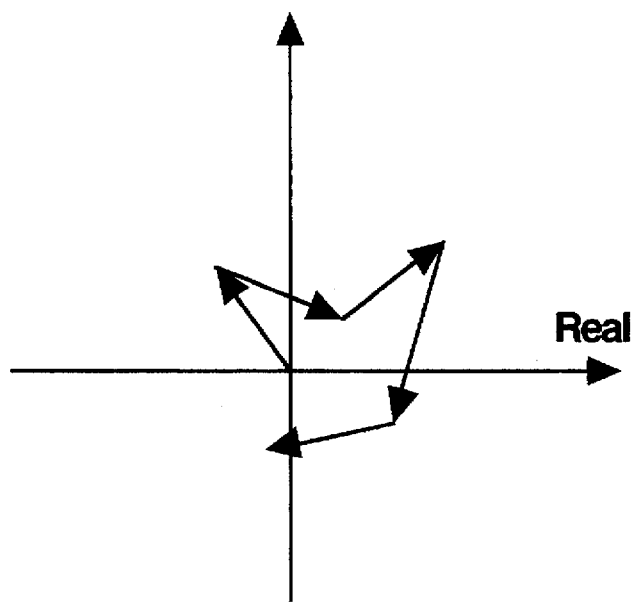
FIG. 9B is a polar plot illustrating how the vector products in the P(d) sum do not line up but instead add non-coherently for samples taken from symbols outside the first OFDM training symbol of the present invention.
Figure 9A:
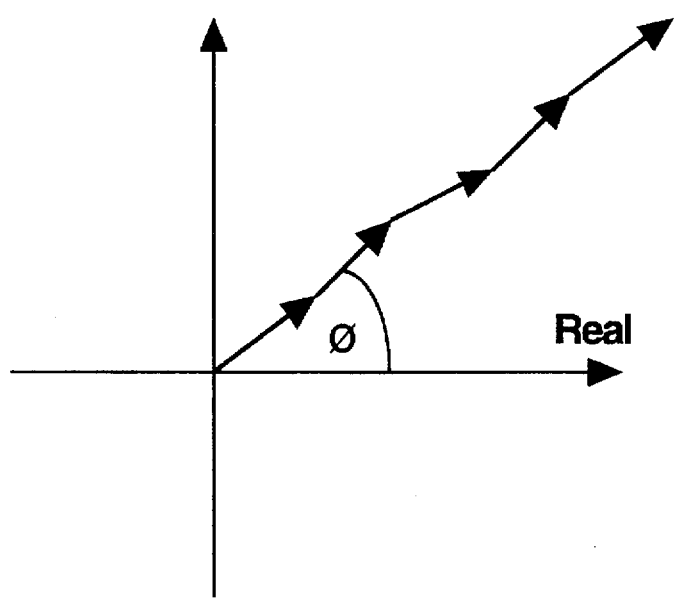
FIG. 9A is a polar plot illustrating how the vector products in the $P(d_{opt})$ sum line up and add coherently for samples taken from the first OFDM training symbol of the present invention.

This sum will be maximized when $d=d_{opt}$ which corresponds to the timing instant of the first sample of first OFDM training sequence 134 because at that instant all the products in the sum will have essentially the same phase, $\phi$, and, therefore, will add coherently. This situation is illustrated in FIG. 9A. By contrast, whenever products in the sum include samples that are not taken from first OPDM training symbol 134, those products in the sum will have random phase and will not add coherently. This is illustrated in FIG. 9B for a case in which all the illustrated product vectors are computed from samples outside first OFDM training symbol 134.

Suppose also that we compute the received power for the second half-symbol using:

$$R(d) = \sum_{i=0}^{L-1} |r_{d+i+L}|^2 \qquad (4)$$

or, alternatively, by using the iterative formula:

$$R(d+1)=R(d)+|r_{d+2L}|^2-|r_{d+L}|^2. \qquad (5)$$

Then, the best estimate for frame and symbol timing according to the present invention is the timing index $d_{opt}$ that maximizes a timing metric, M(d), which is given by:

$$M(d)=|P(d)|^2/(R(d))^2. \qquad (6)$$

Equivalently, one can use other metrics such as the square root of M(d), but this would involve more computation. Also, if there is little variation over time in the strength of signals received, to simplify the computations R(d) need not be calculated and can be assumed to be a constant.

Let $\beta$ denote the distance from d to the best timing point, $d_{opt}$, as a fraction of the L samples in a repeated half-symbol, so that $\beta=0$ corresponds to the best timing point where $d=d_{opt}$, and so that $\beta=1$ corresponds to a timing offset of half a symbol. Let $d_{\beta 0}$ denote the case of being a fraction $\beta$ away from $d_{opt}$. Then for $0 \leq \beta \leq 0.9$:

$$E[M(d_\beta)]=(1-\beta)^2 \qquad (7)$$

at high signal-to-noise ratio (SNR).

At a point outside the first training symbol ($\beta>1$), $M(d_{outside})$ has a chi-square distribution with two degrees of freedom and is not dependent on SNR with:

$$E[M(d_{outside})]=1/L \qquad (8)$$

and $$Var[M(d_{outside})]=1/L^2. \qquad (9)$$

Figure 10:
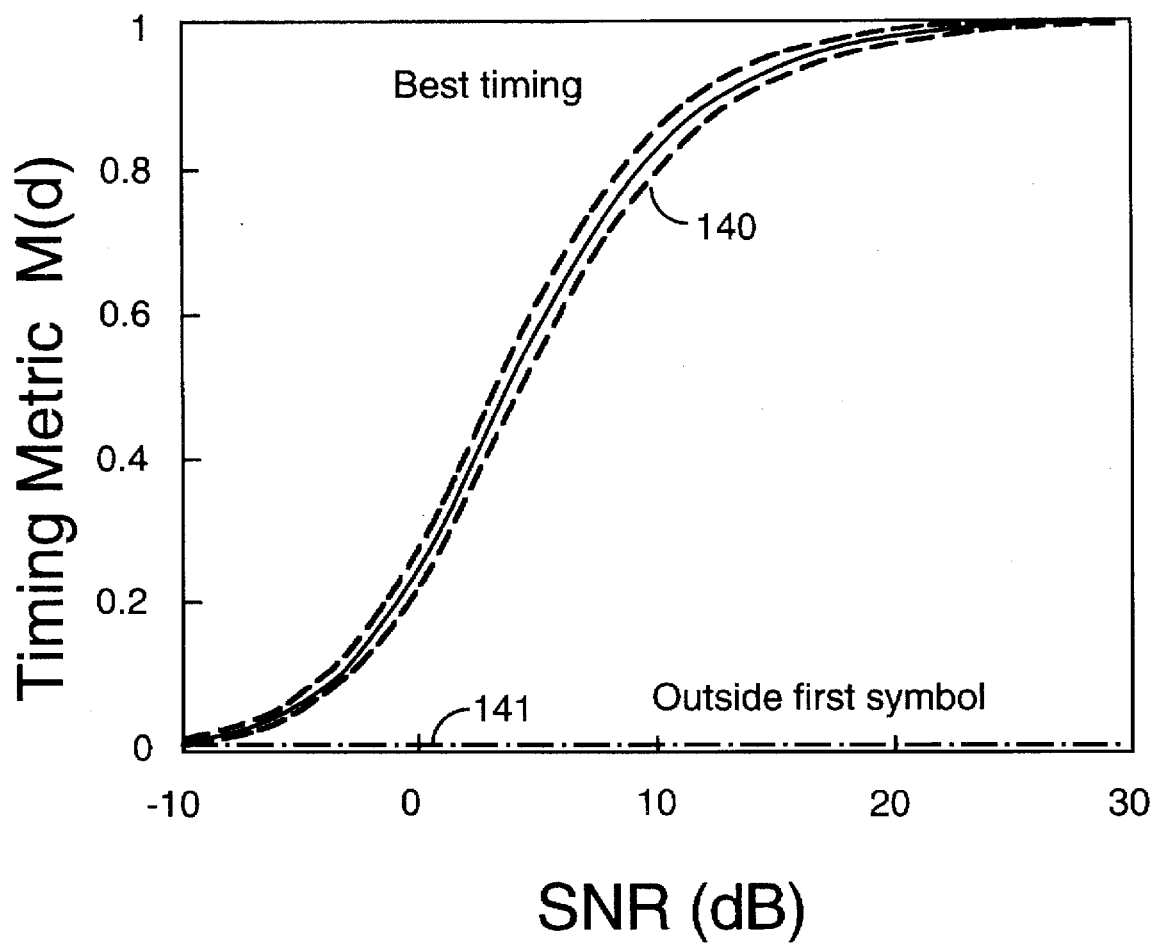
FIG. 10 is a theoretical plot of the timing metric, M(d), versus SNR of the received OFDM signal for the best timing point within the first OFDM training symbol and for other timing points within symbols outside the first OFDM training symbol according to a preferred embodiment of the present invention.

FIG. 10 shows a theoretical plot of the expected value of timing metric M(d) versus SNR at both the best timing point, $d_{opt}$, (curve 140) and at a random point outside first OFDM training symbol 134 (curve 141) for the preferred embodiment of the present invention in which L=8192/2=4096 samples in a half-symbol of the digital TV OFDM signal. The dashed lines indicate three standard deviations from each curve.

Figure 11:
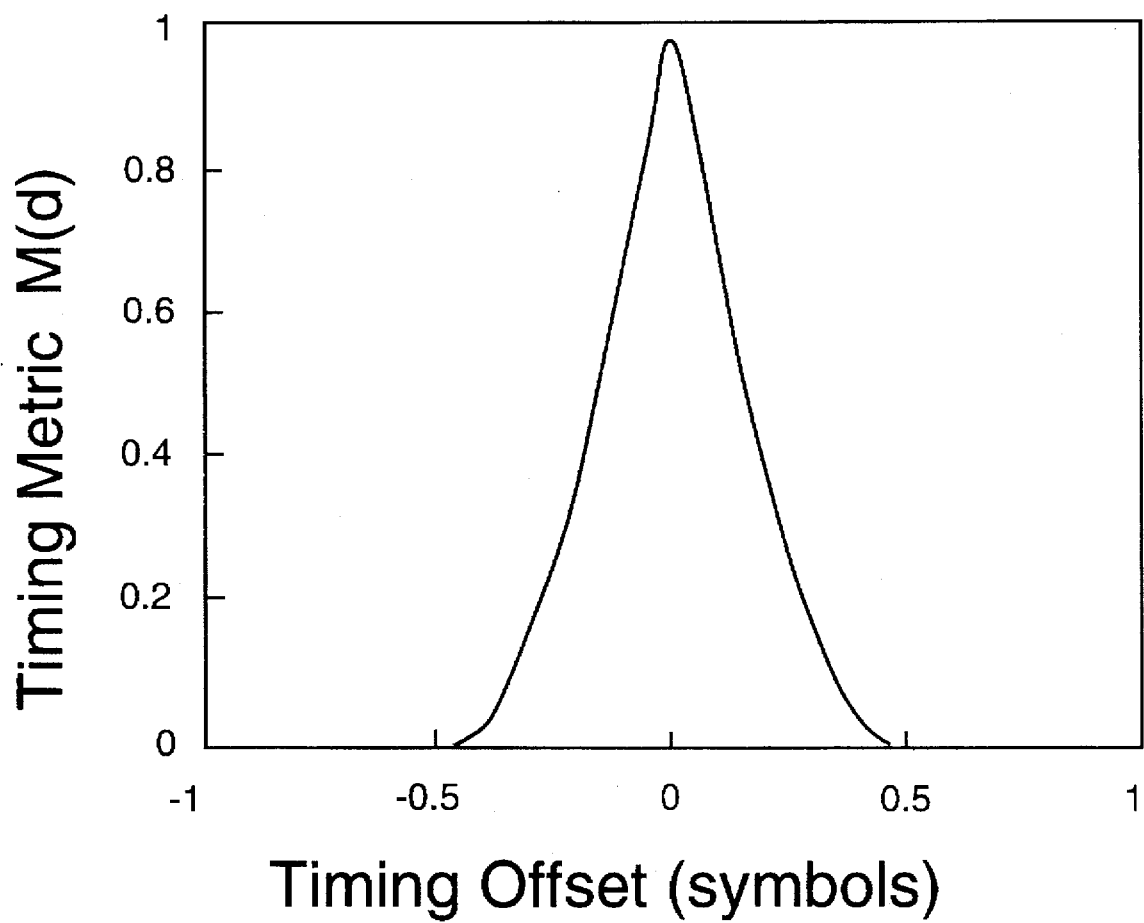
FIG. 11 is a plot of the timing metric, M(d), versus timing offset for the received OFDM signal according to a preferred embodiment of the present invention.

FIG. 11 illustrates the roll-off of timing metric, M(d), from the best timing point, $d_{opt}$, with the axis labeled in terms of timing offset in number of OFDM symbols instead of in terms of timing index. The figure is a plot of the timing metric M(d) versus timing point for a particular example of the preferred embodiment where L=4096 and the OFDM channel has an impulse response of 32 μs, a carrier frequency offset of 12.4 sub-carrier bandwidths, and an SNR of 20 dB. At the peak of the timing metric, the phase of P(d) is 71.97 degrees (not shown in the figure) which corresponds to 0.3999 sub-channel bandwidths.

We now return to FIG. 5, a block diagram of synchronizing apparatus 120, to describe how synchronizing apparatus 120 implements timing synchronization according to the method of the present invention. Synchronizing apparatus 120 includes a data storage means 122, such as a RAM memory in the preferred embodiment, which receives and stores the complex-valued OFDM signal samples, $r_i=p_i+jq_i$, which are consecutively delivered to it from digital lowpass filters 96 and 98. By storing these samples while other components of synchronizing apparatus 120 perform computations and operations according the method of the present invention, data storage means 122 enables synchronizing apparatus 120 to provide fast timing acquisition of the OFDM signal and also enables synchronization to a burst OFDM signal for proper reception of the burst data frame. Storage means 122 can exchange data with computing means 124 as well as with FFT computing means 126.

In applications which use OFDM with continuous frame transmission such as the broadcast digital TV system of the preferred embodiment, storage means 120 must be able to store the samples of at least two symbols. This requirement ensures that all the samples of OFDM training sequence 132 can be simultaneously held while the synchronization operations are performed on these samples. Once a training sequence arrives, all acquisition functions can be performed during the length of the current data frame 130 so that data can be demodulated during the next data frame. In the case of the preferred embodiment, this corresponds to a storage capacity of about 17,000 complex samples. In applications which use OFDM with burst frame transmission such as WLAN, storage means 122 must be able to store the samples of an entire frame since the OFDM receiver must synchronize with the current frame and demodulate the data transmitted in that frame.

Synchronizing apparatus 120 further includes a computing means 124, such as a dedicated DSP firmware processor or a general purpose microprocessor. Computing means 124 can exchange data with both storage means 122 and FFT computing means 126. In the preferred embodiment, computing means 124 uses samples stored in storage means 122 to compute P(d), preferably using the iterative formula (3). Additionally, computing means 124 uses samples stored in storage means 124 to compute R(d), preferably using the iterative formula (5). Computing means 124 further computes the value of the timing metric M(d) and evaluates it to determine the best timing point, $d_{opt}$.

In the preferred embodiment, computing means 124 begins its timing acquisition process by first determining if M(d) has risen above a predetermined threshold, i.e. by checking the condition:

$$|P(d)|^2 > (\text{threshold}).(R(d))^2. \qquad (10)$$

Using this test, computing means 124 need not check every sample. In the preferred embodiment, although only one out of every 100 samples is processed, this timing metric is still able to determine when a training symbol has been received, and it gives a rough estimate of the timing point. Operating under this condition, the expected value of M(d) at the best timing point is 0.98 with a standard deviation of 0.031, and at a position outside the first training symbol, the expected value is 0.024 with a standard deviation of 0.024. For each sample that is processed, there are 10 real multiplications and 11 real additions. Counting each multiplication or addition as one operation, computing means 124 is required to process about 2 million operations per second while waiting for the training sequence to arrive.

Having calculated a rough estimate of the best timing point, as desired above, computing means 124 then calculates $|P(d)|^2$ for all values of d near this timing point estimate by using the sample values stored in storage means 122 in order to get a good estimate of $d_{opt}$. In this small range, computing means 124 ignores $(R(d))^2$ because it does not vary much. Computing means 124 must perform 4096 complex multiplications and additions to get one precise value of $P(d)$ and several thousand more operations to iteratively calculate $P(d)$ and find the maximum, for a total of about 40,000 operations once a rough estimate of timing has been determined. After finding the best timing point, $d_{opt}$, computing means 124 estimates the phase, $\phi$, of $P(d_{opt})$ by using a lookup table for the arctangent function and interpolating to get the necessary precision. This value of phase, $\phi$, is an estimate of the phase $\phi = \pi \cdot T_s \cdot \Delta f_c$.

Although not utilized in the preferred embodiment, timing metric $M(d)$ provides an additional feature. It can be used to estimate the SNR of first OFDM training symbol 134, and, therefore, the SNR of the OFDM channel, by the equation:

$$SNR = \frac{\sqrt{M(d_{opt})}}{1 - \sqrt{M(d_{opt})}} \quad (11)$$

This estimate of the SNR is particularly useful for computing SNR values below approximately 20 dB. Since $M(d_{opt})$ asymptotically approaches 1 as SNR increases, an accurate estimate becomes difficult to compute for SNRs much beyond 20 dB. The estimate of SNR using (11) can be used to set a threshold so that very weak signals will not be decoded, or it can be used in a WLAN to feed back to the transmitter what data rate will be supported so an appropriate constellation and code can be chosen. A lookup table can be implemented based on $M(d_{opt})$, so that no square roots or divisions need to be performed.

Still another feature of $M(d)$ that was not used in the preferred embodiment but could be used in other cases is the power estimate given by $R(d)$. This estimate could be used as part of an automatic gain control (AGC) loop.

3. Carrier Frequency Offset Synchronization

As discussed above, the main difference between the two halves of first OFDM training symbol 134 is a phase difference of:

$$\phi = \pi T_s \Delta f_c \quad (12)$$

which can be estimated by:

$$\phi = \text{angle}(P(d)) \quad (13)$$

near the best timing point. This phase estimate along with some additional computations performed using samples from both first OFDM training symbol 134 and second OFDM training symbol 136 are used for computing the carrier frequency offset, $\Delta f_c$, according to the following method of the present invention.

If $|\phi| = |\pi \cdot T_s \cdot \Delta f_c|$ can be guaranteed to be less than $\pi$, then the carrier frequency offset estimate is given by:

$$\Delta \Delta f_c = \phi / \pi T_s \quad (14)$$

and the second PN sequence modulated onto the even-numbered frequencies of second OFDM training symbol 136 is not needed. For OFDM transmission systems that constantly provide successive frames such as the system for digital TV in the preferred embodiment, this simple estimate is the estimate that should be used during tracking mode once carrier frequency offset has been initially determined and corrected.

During initial carrier frequency synchronization, however, $\Delta f_c$ can be greater than a sub-carrier bandwidth, so the actual frequency offset is given by:

$$\Delta f_c = \phi / \pi T_s + 2z f_1 = \phi / \pi T_s + 2z / T_s, -\pi \leq \phi \leq \pi \quad (15)$$

where z is an integer and $f_1 = 1/T_s$. This $\Delta f_c$ can be quantified in terms of sub-carrier frequency bandwidths, $1/T_s$, as having an even integer part $(2 \cdot z)$, and a positive or negative fractional part, $(\phi/\pi)$. In this more general case for $\Delta f_c$, the method of the present invention for computing and correcting the carrier frequency offset, $\Delta f_c$, is a two-step process. First, the fractional offset term is determined and used to partially correct the samples of the two training symbols. This prevents inter-carrier interference (ICI) while determining the FFTs of the two training symbols. These FFTs are needed for the second step in the carrier frequency synchronization process in which the remaining integer part of the offset is determined and corrected.

An example of the frequency positioning of data within the two training symbols during this two-step process is illustrated in FIG. 12. The first column shows the positioning of the data as transmitted. The second column shows the positioning of the data as originally received for a case where the carrier frequency offset is somewhat more than 2 sub-carrier frequencies in the negative direction. The third column shows the positioning of the data after being partially corrected to allow the data to align properly within sub-carriers, albeit the incorrect sub-carriers, so it can be demodulated via an FFT without suffering from ICI. At this step the offset is almost exactly 2 sub-carrier frequencies in the negative direction. Finally, the fourth column in the figure shows the positioning of the data into the proper sub-carriers after performing the second step of the offset synchronization process.

A detailed description of the method of the present invention for performing carrier frequency offset synchronization is as follows:

After computing the estimate $\phi = \text{angle}(P(d_{opt}))$ as described above, all the samples of the two training symbols 134 and 136 can be corrected to account for the fractional part of the offset by multiplying each sample by $e^{-2\pi\phi j/T_s}$. An FFT can then be performed on the partially frequency-corrected samples of the two training symbols to produce two sequences of sub-symbols, $x_{1,k}$ and $x_{2,k}$, respectively, where $-N \leq k \leq N$. Because of the remaining uncompensated frequency offset of $2z/T_s$, the differentially modulated PN sequence between the two training symbols has been shifted by $2z$ positions. The correctly placed predetermined differentially modulated PN sequence, $v_k$, is known at the receiver. The integer part of the carrier frequency offset can then be calculated by finding $g = g_{correct}$ to maximize:

$$B(g) = \frac{\left| \sum_{k \in X} x^*_{1,k+2g} v^*_k x_{2,k+2g} \right|}{2 \left( \sum_{k \in X} |x_{2,k}|^2 \right)^2} \quad (16)$$

with the integer g spanning the range of possible frequency offsets. X is the set of indices for the even frequency components, $X = \{-N, -N+2, \ldots, -4, 2, 2, 4, \ldots, N-2, N\}$, and N is the number of even-numbered frequencies with the differentially modulated PN sequence, $v_k$. Note that the set X can include fewer than all the even sub-channels provided fewer subchannels will suffice to accurately determine the integer part of the carrier frequency offset, and provided these subchannels are not needed for the sampling rate synchronization. The denominator in equation (16) needs to be computed only once or can even be ignored since it is the same for all g. The total frequency offset estimate is then:

$$\Delta f_c = \phi/\pi T_s + 2g_{correct}/T_s. \tag{17}$$

Since the carrier frequency offset estimate is the sum of a fractional part and an even integer part, the variance of the fractional part of the offset will be the variance of the total estimate if $g = g_{correct}$. At high SNR, this variance is given by:

$$Var[\phi/\pi] = 1/(\pi^2 L \cdot SNR) \tag{18}$$

Using the OFDM system of the preferred embodiment in which L=4096 under the example condition of SNR=20 dB, $Var[\phi/\pi] = 2.5 \times 10^{-7}$ with a standard deviation of $5 \times 10^{-5}$ sub-carrier bandwidths, or equivalently, 0.6 Hz.

To determine if $g_{correct}$ can be reliably found, we look at the expected values and variances of B(g). At the correct frequency offset, $g_{correct}$, all the signal products in the B(g) equation (16) have the same phase and therefore add coherently, resulting in:

$$E[B(g_{correct})] = 1 \tag{19}$$

and $$Var[B(g_{correct})] = 4/(N \cdot SNR), \tag{20}$$

at high SNR. At an incorrect frequency offset, the signal products no longer add in phase, and $B(g_{incorrect})$ has a chi-square distribution with two degrees of freedom such that:

$$E[B(g_{incorrect})] < 1/N \tag{21}$$

and $$Var[B(g_{correct})] < 1/N^2. \tag{22}$$

Figure 13:
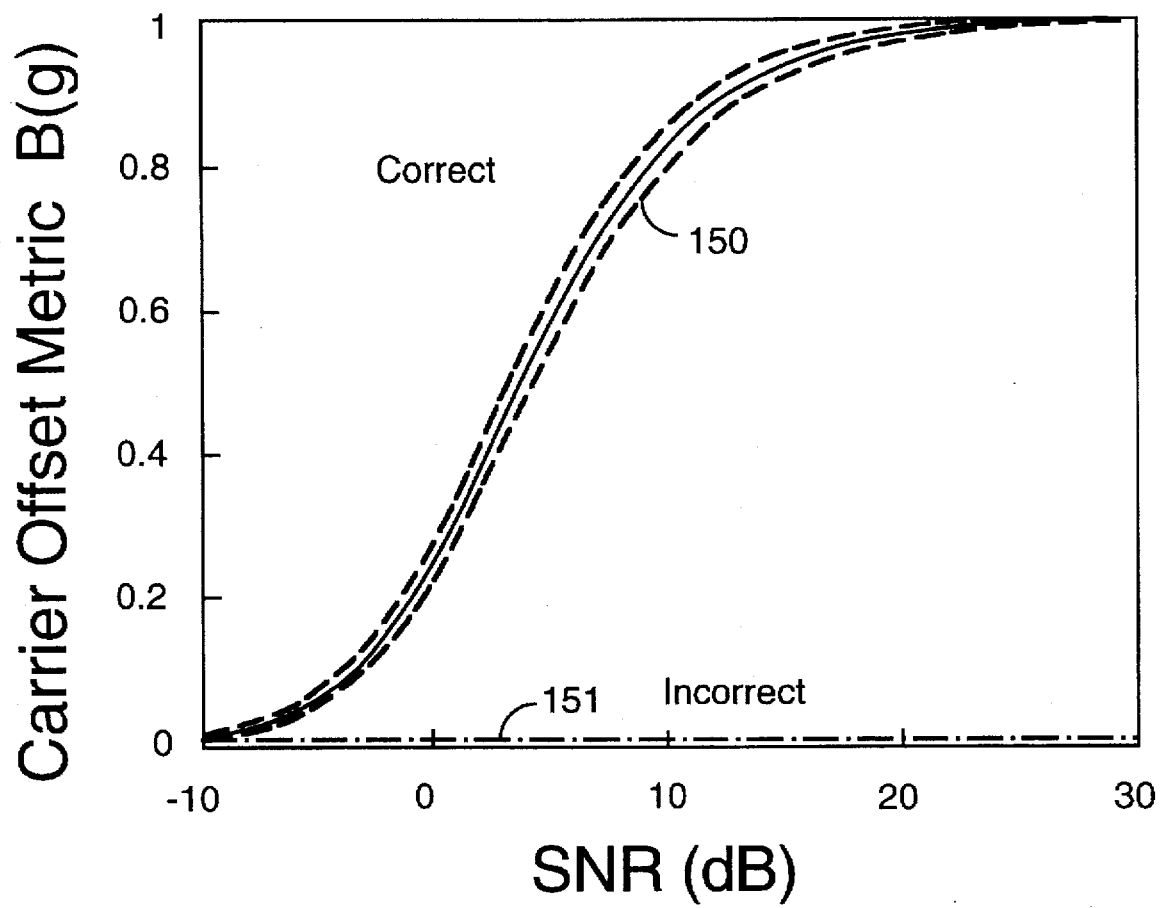
FIG. 13 is a theoretical plot of the carrier frequency offset metric, B(g), versus SNR of the received OFDM signal for the correct frequency offset index, $g_{correct}$, and for a random, incorrect carrier frequency offset index, $g_{incorrect}$, according to a preferred embodiment of the present invention.
Figure 14:
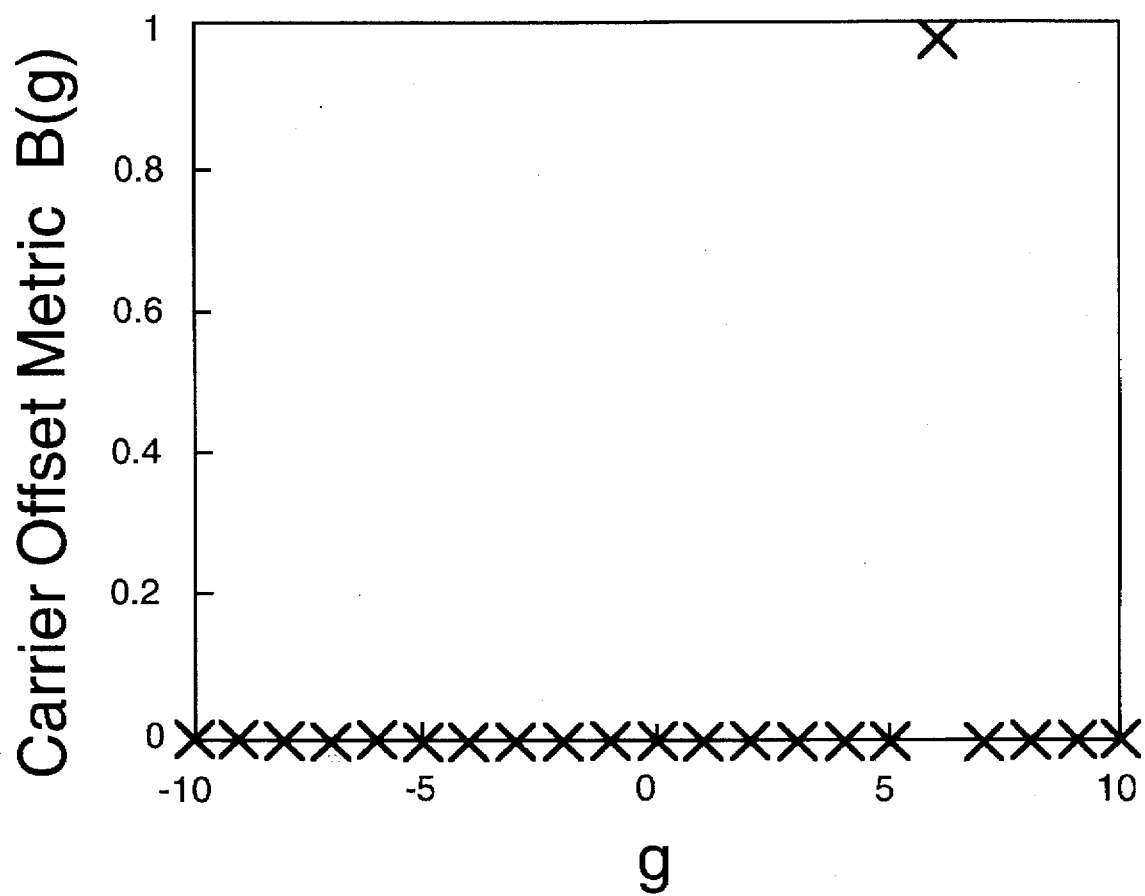
FIG. 14 is a plot of the carrier frequency offset metric, B(g), versus carrier frequency offset index, g, for the received OFDM signal according to a preferred embodiment of the present invention.

FIG. 13 shows a plot of the expected value of the frequency offset metric B(g) versus SNR for both a correct frequency offset index, $g_{correct}$, (curve 150) and an incorrect frequency offset index, $g_{incorrect}$, (curve 151). The dashed lines indicate three standard deviations from each curve. Again consider an example from the preferred embodiment of the present invention under the same conditions that were used in determining the plot of FIG. 11. We had determined that at the peak of the timing metric, $M(d_{opt})$, in FIG. 11, the fractional part of the carrier frequency offset estimate was 0.3999 sub-carrier bandwidths. After correcting by this estimate, FIG. 14 shows that the frequency offset metric B(g) has a maximum at g=6, so that the final, total frequency offset estimate is $2 \cdot g_{correct} + \phi/\pi = 12.3999$ sub-carrier bandwidths.

We now return once again to FIG. 5, a block diagram of synchronizing apparatus 120, to describe how synchronizing apparatus 120 implements the carrier frequency offset estimation, correction, and synchronization according to the method of the present invention. After synchronizing apparatus 120 determines the best timing point $d_{opt}$ and the phase, $\phi$, of $P(d_{opt})$, computing means 124 corrects all the samples, $r_i$, of the two training symbols that are stored in storage means 122 for the fractional part of the carrier offset estimate by multiplying them with the appropriate complex exponential $e^{-2i\phi/2L}$. To do this, computing means 124 first computes the term $2 \cdot \phi/2 \cdot L$ to a high precision and stores it in storage means 122. Then, for each value of index i, computing means 124 computes the argument to the exponential using the iterative formula:

$$2(i+1)\phi/(2L) = 2i\phi/(2L) + 2\phi/(2L) \tag{23}$$

Using this computed argument for each sample, $r_i$, computing means 124 then uses a lookup table, which when given a phase angle returns the appropriate point on the unit circle in the complex plane, to determine the frequency correcting exponential, and multiplies this exponential with the sample. It then returns the partially-correct samples to storage means 122.

Storage means 122 then sends the corrected samples of the two training symbols to FFT computation means 126. FFT computation means 126 performs an FFT to compute the two corresponding sequences of frequency-domain sub-symbols $x_{1,k}$ and $x_{2,k}$ and returns these to storage means 122.

Using the values $x_{1,k}$, $x_{2,k}$, and $v_k$ from storage means 122, computing means 124 then computes B(g) over the possible range of integral frequency offsets. Since the separation between the metric B(g) for the correct and incorrect values of g is very large, computing means 124 uses only a fraction of the total sub-symbol values from sequences $x_{1,k}$ and $x_{2,k}$ to determine the metric $B(g_{correct})$. For example, if computing means 124 uses only about one out of every 100 even-number frequencies in the calculation of B(g), then the metric $B(g_{correct})$ will have an expected value of 0.99 and a standard deviation of 0.03, while $B(g_{incorrect})$ will have an expected value of 0.03 and a standard deviation of 0.03.

For the OFDM digital TV system of the preferred embodiment, the initial fractional correction of the 16384 samples of the two training symbols requires about 150,000 operations (one addition, one lookup, and one complex multiplication per sample). Since FFT computation means 126 must process one symbol every 924 µs, it will take about 2 ms to perform the two FFTs. Multiplication by $v_k^*$ is very simple so that the calculation of B(g) for one value of g requires about 4 W real multiplications and 4 W real additions. In the preferred embodiment, 21 values of g are tested using only 1 out of every 100 even-numbered frequencies, such that carrier frequency offsets of up to 22 kHz can be corrected. The computation of these B(g) values then requires about 6000 total operations.

Once the entire carrier frequency offset has been estimated, there are several available options for synchronizing the receiver to correct for this carrier frequency offset on future or stored samples of the received OFDM signal. In the case of the preferred embodiment, computing means 124 proceeds to multiply each future sample delivered to synchronizing apparatus 120 by the appropriate exponential term, as described above, in order to continuously compensate all later-arriving symbols for the fractional carrier frequency offset. Additionally, computing means 124 sends the value of $g_{correct}$ to FFT computation means 126 so that it will henceforth adjust all sequences of FFT sub-symbols it computes for the whole number part of the carrier frequency estimate by shifting the sequences by $g_{correct}$ sub-carrier positions in order to be able to properly demodulate the data in the OFDM signal. This is the procedure that must be followed in the case of burst frames, since all the samples of the data frame are already stored and must be corrected for both parts of the carrier frequency offset estimate according to this procedure.

Having determined the carrier frequency estimate, however, synchronization of the receiver to the OFDM signal can be achieved in other ways. For example, synchronizing apparatus 120 can send a control signal to either or both local oscillator 80 or 88 to re-align their oscillation frequencies in order to remove the carrier frequency offset. Computing means 124 can then be used to compensate for any residual carrier frequency offset that remains even after re-aligning these oscillators by using it to multiply future samples by the appropriate exponential as described above.

4. Sampling Rate Synchronization

The present invention includes an optional step for estimating and correcting the sampling rate offset at the OFDM receiver. This estimation of sampling rate offset can only be performed after timing and carrier frequency synchronization are completed, preferably according the method described above. The method for sampling rate offset estimation according to the present invention relies on the evaluation of the phase differences between corresponding OFDM frequency-domain sub-symbols from successive OFDM symbols after correct timing has been determined, and after the OFDM frequency-domain sub-symbols have been fully corrected for carrier frequency offset.

As mentioned previously, sampling frequency offset is a secondary consideration in OFDM receivers because it has only a small effect in degrading the BER of such receivers. A sampling rate offset causes a delay in the sampling instant that accumulates over time. If over a time $T_s+T_g$, a sampling rate offset of $\Delta f_{ck}=\Delta t/(T_s+T_g)$ causes an accumulative delay of $\Delta t$ in the sampling instant, then there will be a phase rotation of $2 \cdot \pi \cdot k \cdot \Delta t/T_s$ in the $k^{th}$ OFDM sub-carrier. This can be seen as a slow rotation of the sub-symbol constellation points, with the constellation points at higher frequencies rotating faster. The maximum rotation between adjacent sub-symbols in a frame is directly proportional to the number of carriers. Therefore, an application which must handle a long impulse response, such as the digital TV OFDM system of the preferred embodiment, will need long symbols (and therefore more sub-carriers), and will have greater difficulty with sampling rate offset.

The digital TV OFDM system of the preferred embodiment has a highest frequency of 3392 and a guard interval, $T_g$, that is 1/32 of the useful symbol interval, $T_s$. If the receiver uses relatively inexpensive sampling circuits having a maximum frequency offset of $10^{-5}$, then the maximum phase rotation will be $(360°) \cdot (3392) \cdot (10^{-5}) \cdot (33/32) = 12.59°$ for sub-carriers -3392 and 3392. This will result in a higher BER, especially in constellations with a large number of points, such as a 64-QAM constellation. By contrast, under these conditions, at sub-carrier 1 the maximum phase rotation is only 0.0037°, and therefore, the BER of this sub-carrier will suffer very little degradation. Thus, the higher numbered sub-carriers will suffer the greatest phase rotation and BER degradation.

If a differential phase-shift keying (DPSK) modulation format is used along with differential detection, since the phase shifts do not accumulate, it is possible to ignore the sampling frequency offset and just accept a slightly worse BER. Also, if a small number of sub-carriers are used then the phase rotation, even over a large number of symbols, will not be enough to warrant the correction of sampling rate offset. For example, with a WLAN with a short channel impulse response, there might be 53 sub-carriers (-26 to 26) with a maximum phase rotation of $(360°)(26)(10^{-5})(33/32) = 0.096°$ assuming the training sequence is placed in the center of a frame. Then, from the training sequence to either end of the burst (±47 symbols), the cumulative phase rotation is only 4.5° at sub-carriers -26 and 26, and sampling rate correction can often be ignored. For applications such as the digital TV system of the preferred embodiment, however, a sampling frequency offset adjustment will probably be needed since the phase shifts can be substantial within one frame.

A detailed description of the method of the present invention for performing sampling rate offset estimation and synchronization is as follows:

In order to perform sampling frequency offset estimation and correction according to the present invention, let $y_{1,k}$ and $x_{2,k}'$ be the $k^{th}$ OFDM frequency-domain sub-symbols corresponding to the first and second training symbols, respectively, after: a) establishing symbol and frame timing, b) after compensating the symbols for the fractional carrier frequency offset by correcting their samples, c) after taking the FFTs of these partially frequency offset corrected symbols, and d) after shifting the resulting sequences of OFDM frequency-domain sub-symbols to correct for the whole number portion of the carrier frequency offset. Now let $y_{2,k}$ be the $k^{th}$ OFDM frequency-domain sub-symbols corresponding to the non-differentially modulated second training symbol. These sub-symbol values, $y_{2,k}$, are produced by multiplying $x_{2,k}'$ by $v_k^*$ in order to remove the differential modulation on the OFDM frequency-domain sub-symbols corresponding to the second OFDM training symbol. Having performed this operation and obtained $y_{2,k}$, the only difference between the two sets of OFDM frequency-domain sub-symbols, $y_{1,k}$ and $y_{2,k}$, should be the error caused by the sampling frequency offset. This error causes a phase difference to exist between the pair of corresponding OFDM frequency-domain sub-symbols, $y_{1,k}$ and $y_{2,k}$. This phase difference can be found for each sub-carrier by multiplying the conjugate of the OFDM frequency-domain sub-symbol, $(y_{1,k})^*$, from the first OFDM training symbol corresponding to a particular sub-carrier by the value from the second training symbol, $y_{2,k}$, corresponding to the same sub-carrier.

Figure 15:
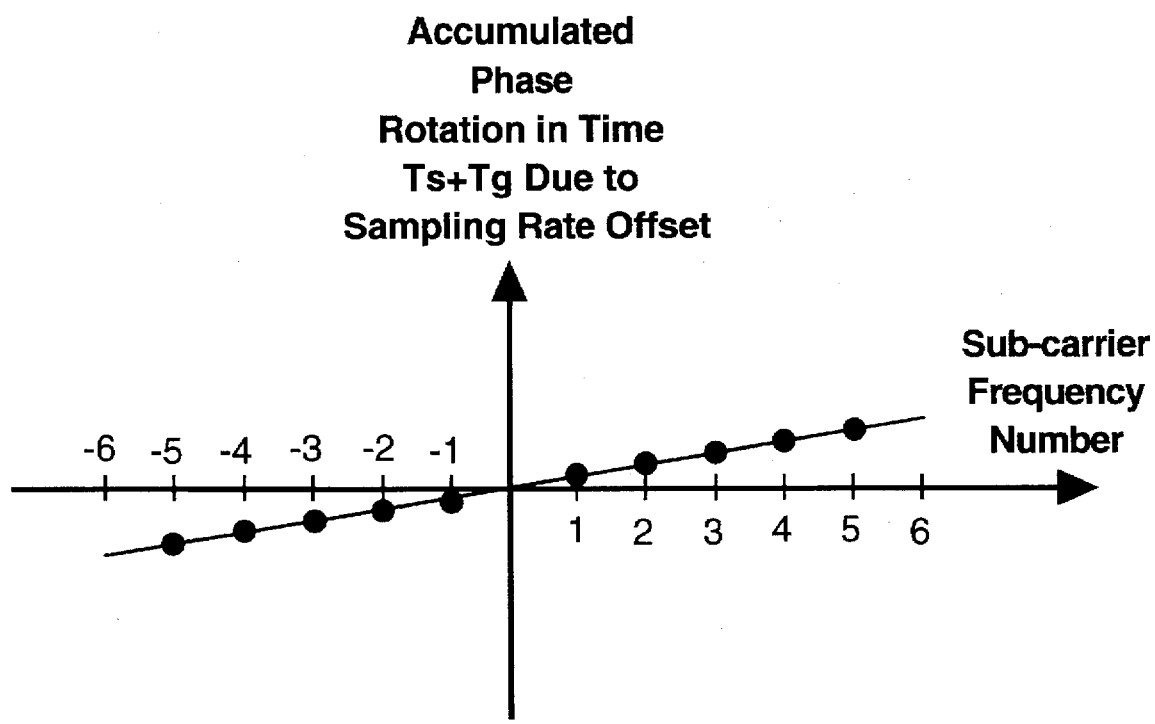
FIG. 15 is a plot illustrating the accumulation of phase error in a time $T_s+T_g$ versus sub-carrier frequency number due to sampling rate offset for OFDM frequency-domain sub-symbols demodulated from successive OFDM symbols in the presence of a finite sampling rate offset.

This phase difference caused by the sampling rate offset is a linear function of the sub-carrier frequency number, and it has a slope proportional to the sampling frequency offset. This is illustrated in FIG. 15. Let $\theta = 2 \cdot \pi \cdot \Delta t/T_s$, which is the phase rotation of the first sub-carrier from the first training symbol to the second training symbol and is 1/k times the phase rotation of the $k^{th}$ sub-carrier. Also, let X be the set of indices for the even-numbered sub-carriers, $X=\{-N, -N+2, \ldots, -4, -2, 2, 4, \ldots, N-2, N\}$. Then $\theta$ can be estimated by:

$$\Phi = \frac{\sum_{k \in x} \text{angle}(y^*_{1,k} y_{2,k}) |y^*_{1,k} y_{2,k}|^2 k}{\sum_{k \in x} |y^*_{1,k} y_{2,k}|^2 k^2} \quad (24)$$

This computation is equivalent to the linear minimum mean squared error (MMSE) estimator if the expected values of both the OFDM frequency-domain sub-symbols indices and the phase differences are zero when weighted by the squares of the magnitudes of the sub-channels. Since only the slope is calculated, the estimate will not be affected much by any residual frequency offset or phase noise, such as from a local oscillator, since these small fluctuations will change the intercept and not the slope of $\theta$.

Assume that each OFDM frequency-domain sub-symbol is a sum of a signal and a noise term and that the OFDM channel is flat such that the weightings for the sub-channel amplitudes can be ignored in the calculation of $\Theta$. With these assumptions and using the small angle approximation for the arc tangent function, the variance of the estimate, $\text{Var}[\Theta]$, can be calculated as a function of the SNR and N, the number of even-numbered sub-carriers. Assuming high SNR:

$$\text{Var}[\Theta] \approx 2.25/(SNR \cdot N^3). \quad (25)$$

For the OFDM digital TV system of the preferred embodiment, with an SNR of 20 dB and N=3392, the variance is $5.8 \times 10^{-13}$, and one standard deviation is $7.6 \times 10^{-7}$. This is about 85 times smaller than the maximum possible value of $\theta$, which is $2\pi \cdot 10^{-5}$. In order to further reduce the variance of this estimate, the two training symbols can be placed further apart within the data frame. This reduces the variance by a factor of $C^2$ if the training symbols are placed C times further apart, assuming the channel does not change very much between the symbols. Exploiting this idea, in the tracking mode, the sampling frequency offset can be calculated very accurately using training symbols from consecutive frames as long as the channel is slowly time-varying.

Additionally, in the estimate of θ, the higher frequency sub-carriers have a larger influence than the lower frequency sub-carriers. A fading channel will do as well as a flat channel with an SNR equal to the weighted average (by $k^2$) of the SNRs of its sub-channels.

We now return once again to FIG. 5, a block diagram of synchronizing apparatus 120, to describe how synchronizing apparatus 120 implements the sampling rate offset estimation and synchronization for the preferred embodiment according to the method of the present invention. After synchronizing apparatus 120 determines an estimate for the entire carrier frequency offset including the fractional part, given by $\phi/(\pi \cdot T_s)$, and the integral part, given by $(2 \cdot g_{correct})/T_s$, it begins the process of determining sampling rate offset. Using the determined value of computing means 124 shifts the frequency components of the sequence of frequency domain sub-symbols $x_{1,k}$ and $x_{2,k}$ by $2 \cdot g_{correct}$ sub-carriers to correct for the whole number part of the carrier frequency offset, and it stores the results ($y_{1,k}$ and $x_{2,k}'$, respectively) into storage means 122. Computing means 124 then uses the sequences $v_k^*$ to remove the differential modulation from sub-symbol sequence $x_{2,k}'$ by multiplying the two sequences term by term. The result, $y_{2,k}$, is then stored into storage means 122. Finally, computing means 124 computes an estimate for the phase rotation of the first sub-carrier, θ, according to equation (24) above and stores the value of the estimate into storage means 122.

For the OFDM digital TV system of the preferred embodiment, the maximum expected phase rotation at the highest sub-carrier (number 3392) is about 12.59°. Since all the angles are small, there are two simplifications which are made to simplify the computations performed by computing means 124. First since the maximum expected phase rotation of about 12.59° is much less than 180°, there should be no phase wrap-around, so there is no need to unwrap the angles. Second, the small angle approximation for the arc-tangent function can be used, $\tan^{-1}(x) \approx x$. Let $y = yr + jyi$, where yr denotes the real part of y and yi denotes the imaginary part of y. Then using the approximation for small angles, $$\mathrm{angle}[(a+jb)(c+jd)] = \mathrm{Im}[(a+jb)(c+jd)]/\mathrm{Re}[(a+jb)(c+jd)] = (ad+bc)/(ac-bd) \quad (24)$$

where (a+jb) and (c+jd) are any two complex numbers, computing means 124 uses the less computationally complex equation:

$$\theta = \frac{\sum_{k \in x} (yr_{1,k}^* yi_{2,k} + yi_{1,k}^* yr_{2,k})(yr_{1,k}^{*2} + yi_{1,k}^{*2})(yr_{2,k}^2 + yi_{2,k}^2)k}{\sum_{k \in x} (yr_{1,k}^{*2} + yi_{1,k}^{*2})(yr_{2,k}^2 + yi_{2,k}^2)k^2} \quad (25)$$

to determine an estimate for the phase rotation. This computation requires 12 real multiplies, 6 real additions, and one real division for each of the W terms in the estimate.

Since the lower frequency components have very little effect on the estimate of the sampling rate offset, they can be safely ignored if they are not needed to unwrap the phase, as is true for the preferred embodiment. For example, frequency 1 has $1/(100)^2 = 1/10{,}000$ times the influence of frequency 100 if both sub-channels have the same attenuation. Thus, in the preferred embodiment, using only the higher half of the frequencies [−3392, −3390, . . . , −1698, 1698, . . . 3390, 3392], the number of computations is cut in half while the variance of the estimate increases by only 7%. Thus, using only the higher frequencies, there are about 60,000 operations required to determine the phase rotation estimate.

Once the estimate for the phase rotation due to sampling rate offset has been determined, there are several possibilities for correcting for this offset. In the preferred embodiment, computing means 124 multiplies each frequency-domain component produced by FFT computing means by an appropriate correcting exponential to compensate for the accumulated phase due to sampling rate offset. Other embodiments of the present invention could provide a means for computing means 124 to adjust the sampling rate determined by clock circuit 86 in order to lessen or eliminate the sampling rate offset.

5. General

The method and apparatus of the present invention provides for rapid, accurate, and robust synchronization of a receiver to an OFDM signal that has been transmitted through a channel. The method and apparatus work well in fading channels because the method averages over all the sub-carriers. Additionally, the preferred embodiment according to the present invention achieves synchronization within a maximum of two frames-up to one frame to wait for the training sequence to arrive, and the duration of one frame to process the training sequence. Thus, in the preferred embodiment, this would require a maximum of 0.17 seconds. Prior art methods require as much as 8 seconds, which is too long for people switching channels in an OFDM digital TV system.

Many modifications of the preferred embodiment are possible without exceeding the scope of the present invention, and many of these would be obvious to those skilled in the art. For example, the synchronizing apparatus 120 of the preferred embodiment could be implemented in either software on a general purpose computer or as DSP firmware. In addition, certain details of the present description can be changed in obvious ways without altering the function or results of the essential ideas of the invention. For example, the roles of even and odd may be exchanged in the definitions of the training symbols, resulting in obvious modifications to the description of the preferred embodiment. Therefore, although the invention has been described in connection with a preferred embodiment, it will be understood that this description is not intended to limit the invention thereto, but the invention is intended to cover all modifications and alternative constructions falling within the spirit and scope of the invention as expressed in the appended claims and their legal equivalents.

We claim:

1. A method for synchronizing a receiver to an OFDM signal, said OFDM signal comprising a first OFDM training symbol exhibiting a half-symbol symmetry, the method comprising the steps of:

a) coupling said OFDM signal into said receiver;

b) performing an analog-to-digital conversion of said OFDM signal to obtain samples of said OFDM signal; and c) performing calculations on said samples to evaluate a timing metric, said timing metric utilizing the half-symbol symmetry of said first OFDM training symbol such that said timing metric indicates the correct symbol/frame timing point;

whereby said receiver can achieve timing synchronization with said OFDM signal, enabling said receiver to demodulate said OFDM signal in order to recover data encoded thereon.

2. The method of claim 1 wherein the step of performing calculations on said samples to evaluate a timing metric comprises the steps of:

a) computing a sum of vector products $$P(d) = \sum_{i=0}^{L-1} (r^*_{d+i} r_{d+i+L}),$$

where $\{r_i\}$ are complex values of the samples and d is a timing index;

b) computing a number $$R(d) = \sum_{i=0}^{L-1} |r_{d+i+L}|^2;$$

c) computing the timing metric by $M(d)=|P(d)|^2/(R(d))^2$;

d) incrementing the timing index d; and e) repeating steps a), b), c), and d) for successive timing points in order to determine an index $d_{opt}$ which maximizes said timing metric and indicates an optimal symbol/frame timing point for proper timing synchronization of said receiver to said OFDM signal;

whereby said receiver can achieve timing synchronization with said OFDM signal, enabling said receiver to demodulate said OFDM signal in order to recover data encoded thereon.

3. The method of claim 1 wherein said OFDM signal is transmitted to said receiver on a transmit carrier of frequency $f_{ct}$, the method further comprising the steps of:

a) computing a sum of vector products $$P(d_{opt}) = \sum_{i=0}^{L-1} (r^*_{d_{opt}+i} r_{d_{opt}+i+L}),$$

where $\{r_i\}$ are complex values of the samples and $d_{opt}$ is a correct timing point; and b) computing an angle, $\phi$; of said sum of vector products such that $\phi(\pi \cdot T_s)$, where $T_s$ is a symbol interval, is an estimate of a carrier frequency offset $\Delta f_c$;

whereby said receiver can estimate said carrier frequency offset to a maximum of $\pm 1/T_s$, the estimate enabling said receiver to synchronize to the frequencies of the OFDM sub-carriers and thereby minimize inter-carrier interference.

4. The method of claim 1 wherein said first OFDM training symbol comprises even-numbered sub-carriers modulated by a first predetermined PN sequence of frequency-domain sub-symbols, and wherein said OFDM signal also comprises a second OFDM training symbol, said second OFDM training symbol comprising even-numbered sub-carriers modulated by a second predetermined PN sequence of frequency-domain sub-symbols, the method further comprising the steps of:

a) correcting each sample of said first OFDM training symbol and said second OFDM training symbol in order to obtain samples that are partially-corrected for carrier frequency offset;

b) performing a discrete Fourier transform on said partially-corrected samples to obtain sequences of frequency-domain sub-symbols $x_{1,k}$ and $x_{2,k}$ corresponding to said first OFDM training symbol and said second OFDM training symbol, respectively;

c) computing a carrier frequency offset metric, said carrier frequency offset metric utilizing a differential modulation between said second OFDM training symbol and said first OFDM training symbol such that said carrier frequency offset metric indicates a remaining carrier frequency offset;

whereby said receiver can estimate said carrier frequency offset including offsets of many sub-carrier bandwidths, enabling said receiver to synchronize to the frequencies of said sub-carriers, minimize ICI, and demodulate said OFDM signal to recover data encoded thereon.

5. The method of claim 4 wherein the differential modulation of the even-numbered frequencies of said second OFDM training symbol relative to said first OFDM training symbol is given by a predetermined sequence $v_k$ and wherein the step of computing a carrier frequency offset metric comprises the steps of:

a) using said frequency-domain sub-symbols $x_{1,k}$ and $x_{2,k}$, computing a carrier frequency offset metric, $B(g)$, according to the equation:

$$B(g) = \frac{\left| \sum_{k \in x} x^*_{1,k+2g} v^*_{2,k+2g} \right|}{2 \left( \sum_{k \in x} |x_{2,k}|^2 \right)^2}$$

or an equivalent thereof, wherein g is an integer corresponding to a carrier frequency offset of 2·g sub-carriers, X is a set of indices for the even-numbered sub-carriers such that $X=\{-N, -N+2, \ldots, -4, 2, 2, 4, \ldots, N-2, N\}$, and N is a number of even-numbered frequencies modulated with the differentially modulated PN sequence $v_k$; and, b) repeating step a) for a range of possible carrier frequency offsets in order to determine an integer $g_{correct}$ which maximizes said frequency offset metric $B(g)$, such that the integer $2 \cdot g_{correct}$ indicates a remaining carrier frequency offset in terms of sub-carrier bandwidths;

whereby said receiver can estimate said carrier frequency offset including offsets of many sub-carrier bandwidths, enabling said receiver to synchronize to the frequencies of said sub-carriers, minimize ICI, and demodulate said OFDM signal to recover data encoded thereon.

6. The method of claim 4 wherein said first predetermined PN sequence and said second predetermined PN sequence consist only of QPSK sub-symbols, said QPSK sub-symbols forming a phase-quadrature constellation.

7. The method of claim 4 further comprising the steps of:

a) correcting said sequences of frequency-domain sub-symbols $x_{1,k}$ and $x_{2,k}$ for a remainder of the carrier frequency offset, thereby producing two sets of frequency components $y_{1,k}$ and $x_{2,k}'$, respectively;

b) removing a differential modulation on the second sequence of frequency components $x_{2,k}'$ to obtain a non-differentially modulated sequence of frequency components, $y_{2,k}$; and, c) computing an estimated value for a phase rotation, $\theta$, of the first sub-carrier during a symbol-plus-guard interval, $T_s+T_g$, according to the equation:

$$\Phi = \frac{\sum_{k \in x} \text{angle}(y^*_{1,k} y_{2,k})|y^*_{1,k} y_{2,k}|^2 k}{\sum_{k \in x} |y^*_{1,k} y_{2,k}|^2 k^2}$$

or an equivalent thereof, said phase rotation corresponding to a sampling frequency offset, $\Delta f_{ck}$, according to the equations:

$$\theta = 2\pi \cdot \Delta t / T_s$$

and $$\Delta f_{ck} = f_{ck} \Delta t / (T_s + T_g),$$

wherein $\Delta t$ is a sampling time error that accumulates in a time $T_s + T_g$ due to said sampling frequency offset; whereby said receiver can estimate said sampling frequency offset, enabling said receiver to synchronize to said OFDM signal and thereby avoid an increase in BER due to said sampling frequency offset as said receiver demodulates said OFDM signal to recover data encoded thereon.

8. The method of claim 7 wherein odd-numbered sub-carriers of said second OFDM training symbol are modulated by a predetermined third PN sequence of OFDM frequency-domain sub-symbols such that said third PN sequence can be used for channel estimation of said odd-numbered sub-carriers.

9. A method for synchronizing a receiver to an OFDM signal, said OFDM signal comprising a first OFDM training symbol having half-symbol symmetry; the method comprising the steps of:

a) determining a correct timing synchronization of a received OFDM signal such that a timing index $d_{opt}$ is determined which indicates a position of a first sample of said first OFDM training symbol within said OFDM signal;

b) computing a sum $$P(d_{opt}) = \sum_{i=0}^{L-1} (r^*_{d_{opt}+i} r_{d_{opt}+i+L});$$

and c) computing an angle, $\phi$, of said sum such that $\phi/(\pi \cdot T_s)$ is an estimate of a carrier frequency offset of the received OFDM signal, where $T_s$ is a symbol interval;

whereby said receiver can estimate said carrier frequency offset to a maximum of $\pm 1/T_s$, the estimate enabling said receiver to synchronize to the frequencies of the OFDM sub-carriers and thereby minimize ICI.

10. The method of claim 9 wherein even-numbered sub-carriers of said first OFDM training symbol are modulated by a first predetermined PN sequence of frequency-domain sub-symbols and wherein said OFDM signal also comprises a second OFDM training symbol, said second OFDM training symbol comprising even numbered sub-carriers modulated by a second predetermined PN sequence of frequency-domain sub-symbols such that a differential modulation on the even-numbered sub-carriers of said second OFDM training symbol relative to said first OFDM training symbol is given by a sequence $v_k$, the method further comprising the steps of:

a) correcting each sample of said first OFDM training symbol and said second OFDM training symbol in order to obtain samples that are partially-corrected for carrier frequency offset;

b) performing a discrete Fourier transform on said partially-corrected samples to obtain sequences of frequency-domain sub-symbols $x_{1,k}$ and $x_{2,k}$ corresponding to said first OFDM training symbol and said second OFDM training symbol, respectively;

c) computing a remaining carrier frequency offset;

d) correcting said sequences of frequency-domain sub-symbols $x_{1,k}$ and $x_{2,k}$ for the remaining carrier frequency offset, thereby producing two sequences of frequency components $y_{1,k}$ and $x_{2,k}'$, respectively;

e) removing a differential modulation on the second sequence of frequency components $x_{2,k}'$ to obtain a non-differentially modulated sequence of frequency components, $y_{2,k}$; and, e) computing an estimated value for the phase rotation, $\theta$, of a first sub-carrier during a symbol plus guard interval, $T_s + T_g$, according to the equation:

$$\Phi = \frac{\sum_{k \in x} \text{angle}(y^*_{1,k} y_{2,k})|y^*_{1,k} y_{2,k}|^2 k}{\sum_{k \in x} |y^*_{1,k} y_{2,k}|^2 k^2}$$

or an equivalent thereof, said phase rotation corresponding to a sampling frequency offset, $\Delta f_{ck}$, according to the equations:

$$\theta = 2\pi \cdot \Delta t / (T_s + T_g)$$

and $$\Delta f_{ck} = f_{ck} \Delta t / T_s$$

wherein at is the sampling time error that accumulates in a time $T_s + T_g$ due to said sampling frequency offset; whereby said receiver can estimate said sampling frequency offset, enabling said receiver to synchronize to said OFDM signal and thereby avoid an increase in BER due to said sampling frequency offset as said receiver demodulates said OFDM signal to recover data encoded thereon.

11. The method of claim 9 wherein the step of determining the correct timing synchronization of said OFDM signal comprises the step of performing calculations on said samples to evaluate a timing metric, said timing metric utilizing the half-symbol symmetry of said first OFDM training symbol such that said timing metric indicates the correct timing point, $d_{opt}$, whereby said receiver can achieve timing synchronization with said OFDM signal, enabling said receiver to demodulate said OFDM signal in order to recover data encoded thereon.

12. The method of claim 11 wherein the step of performing calculations on said samples in order to determine the correct timing synchronization comprises the steps of:

a) using said samples, computing a sum of vector products according to the equation:

$$P(d) = \sum_{i=0}^{L-1} (r^*_{d+i} r_{d+i+L}),$$

wherein timing index, d, is an integer that represents a timing point corresponding to a sampling instant of a first of 2L consecutive complex-valued samples used in the equation, and wherein L is a number of complex samples in one half of an OFDM symbol;

b) using a second half of said 2L complex-valued samples, computing a number $$R(d) = \sum_{i=0}^{L-1} |r_{d+i+L}|^2;$$

c) computing a timing metric $M(d)=|P(d)|^2/(R(d))^2$;

d) incrementing said timing index; and, e) repeating steps a), b), c), and d) for successive timing points in order to determine an index $d_{opt}$ which maximizes said timing metric and indicates an optimal frame/symbol timing point for proper timing synchronization of said receiver to said OFDM signal;

whereby said receiver can achieve timing synchronization with said OFDM signal, enabling said receiver to demodulate said OFDM signal in order to recover data encoded thereon.

13. The method of claim 10 further comprising the step of computing a carrier frequency offset metric, said carrier frequency offset metric utilizing a differential modulation between said first OFDM training symbol and said second OFDM training symbol such that said carrier frequency offset metric indicates the remaining carrier frequency offset;

whereby said receiver can estimate said carrier frequency offset including offsets of many sub-carrier bandwidths, enabling the receiver to synchronize to the frequencies of said sub-carriers, minimize ICI, and demodulate said OFDM signal to recover data encoded thereon.

14. The method of claim 13 wherein said first predetermined PN sequence and said second predetermined PN sequence consist only of QPSK sub-symbols, said QPSK sub-symbols forming a phase-quadrature constellation, in order to simplify the required computations.

15. The method of claim 13 wherein the differential modulation on the even-numbered frequencies of said second OFDM training symbol relative to said first OFDM training symbol is given by the sequence $v_k$ and wherein the step of computing a carrier frequency offset metric comprises the steps of:

a) using said frequency-domain sub-symbols $x_{1,k}$ and $x_{2,k}$, computing the carrier frequency offset metric according to the equation $$B(g) = \frac{\left| \sum_{k \in X} x^*_{1,k+2g} v^*_k x_{2,k+2g} \right|}{2 \left( \sum_{k \in X} |x_{2,k}|^2 \right)^2}$$

or equivalent thereof, wherein g is an integer corresponding to an offset of 2·g sub-carriers, X is a set of indices for even-numbered sub-carriers such that X={−N, −N+2, ..., −4, −2, 2, 4, ..., N−2, N}, and N is a number of even-numbered frequencies modulated with the differentially modulated PN sequence $v_k$; and, b) repeating step a) for a range of possible carrier frequency offsets in order to determine an integer $g_{correct}$ which maximizes said frequency offset metric such that the integer 2·$g_{correct}$ indicates the remaining carrier frequency offset measured in terms of sub-carrier bandwidths;

whereby said receiver can estimate said carrier frequency offset including offsets of many sub-carrier bandwidths, enabling the receiver to synchronize to the frequencies of said sub-carriers, minimize ICI, and demodulate said OFDM signal to recover data encoded thereon.

16. The method of claim 13 wherein odd-numbered sub-carriers of said second OFDM training symbol are modulated by a predetermined third PN sequence of OFDM frequency-domain sub-symbols such that said third PN sequence can be used for channel estimation of said odd-numbered sub-carriers.

17. A method for OFDM signal transmission, the method comprising the steps of:

a) creating a first OFDM training symbol having half-symbol symmetry; and b) transmitting said first OFDM training symbol within an OFDM signal frame;

whereby acquiring timing synchronization to said OFDM signal is accomplished by utilizing the half-symbol symmetry of said first OFDM training symbol.

18. The method of claim 17, said method further comprising the steps of:

a) creating a second OFDM training symbol, said second OFDM training symbol comprising even-numbered sub-carriers modulated by a second predetermined PN sequence of frequency-domain sub-symbols;

b) transmitting said second OFDM training symbol within said OFDM signal frame;

whereby acquiring frequency synchronization to said OFDM signal may be accomplished by utilizing the half-symbol symmetry of said first OFDM training symbol along with the differential modulation on the second OFDM training symbol relative to that of said first OFDM training symbol in order to estimate carrier frequency offset.

19. An apparatus for synchronizing a receiver to an OFDM signal, said OFDM signal comprising a first OFDM training symbol having half-symbol symmetry, said synchronizing apparatus comprising:

a) storage means for storing digital samples, $r_i$, of said OFDM signal and results of computations performed thereon; and b) computing means for performing computations on said samples in order to evaluate a timing metric, said timing metric indicating a correct timing point by utilizing the half-symbol symmetry of said first OFDM training symbol;

whereby said receiver can achieve timing synchronization to said OFDM signal, enabling said receiver to demodulate said OFDM signal in order to recover data encoded thereon.

20. The apparatus of claim 19 wherein said computing means for evaluating a timing metric performs operations comprising the steps of:

a) using said samples, computing a sum of vector products according to the equation:

$$P(d) = \sum_{i=0}^{L-1} (r^*_{d+i} r_{d+i+L}),$$

wherein the timing index, d, is an integer that represents the timing point corresponding to a sampling instant of the first of 2L consecutive samples used in the equation, and wherein L is a number of samples in one half of an OFDM symbol;

b) using a second half of said 2L samples, computing a number $$R(d) = \sum_{i=0}^{L-1} |r_{d+i+L}|^2;$$

c) computing a timing metric $M(d)=|P(d)|^2/(R(d))^2$;

d) incrementing said timing index; and, e) repeating steps a), b), c), and d) for successive timing points in order to determine an index $d_{opt}$ which maximizes said timing metric and indicates an optimal symbol/frame timing point for proper timing synchronization of said receiver to said OFDM signal; whereby said receiver can achieve timing synchronization with said OFDM signal, enabling said receiver to demodulate said OFDM signal in order to recover data encoded thereon.

21. The apparatus of claim 20 wherein said OFDM signal exhibits a carrier frequency offset $\Delta f_c$, the apparatus further comprising:
  a) computing means for computing a FFT of OFDM symbols from their corresponding 2L samples in order to produce sequences of frequency-domain sub-symbols;
  b) computing means for performing the following computations in order to estimate said carrier frequency offset:
    b.i) computing the angle, $\phi$, of said sum of vector products, P(d), for $d=d_{opt}$ such that $\phi(\pi \cdot T_s)$ is an estimate of the fractional part of said carrier frequency offset when said carrier frequency offset is measured in terms of a fractional part, $\phi/(\pi \cdot T_s)$, and an integer part, $(2 \cdot z/T_s)$, where z is an integer;
    b.ii) correcting each sample of said first OFDM training symbol and said second OFDM training symbol in order to obtain partially-corrected training symbol samples;
    b.iii) computing a carrier frequency offset metric $$B(g) = \frac{\left| \sum_{k \in x} x^*_{1,k+2g} y^*_{k,2,k+2g} \right|}{2 \left( \sum_{k \in x} |x_{2,k}|^2 \right)^2}$$

or an equivalent thereof, wherein g is an integer corresponding to a carrier frequency offset of 2 g sub-carrier frequencies, X is the set of indices for the even-numbered sub-carriers such that X={-N, -N+2, ..., -4, 2, 2, 4, ..., N-2, N}, and N is the number of even-numbered frequencies that were modulated with the differentially modulated PN sequence; and
    b.iv) repeating the computation of step b.iii) for the range of possible whole-number carrier frequency offsets in order to determine an integer $g_{correct}$ which maximizes said frequency offset metric, such that the integer $2 \cdot g_{correct}$ indicates said whole number part of said carrier frequency offset,
whereby said receiver may use the estimated values of carrier frequency offset to synchronize to the sub-carriers of said OFDM signal, thereby enabling the receiver to demodulate said sequences OFDM frequency-domain sub-symbols from said sub-carriers in order to recover said baseband data.

22. The apparatus of claim 21 wherein said first PN sequence and said second PN sequence consists only of QPSK sub-symbols, said QPSK sub-symbols forming a phase-quadrature constellation.

23. The apparatus of claim 21 wherein said OFDM signal has a sampling rate offset of $\Delta f_{ck}$, the apparatus further comprising a computing means for performing the following computations in order to estimate said sampling rate offset:
  a) removing said whole number part of the estimated carrier frequency offset from said frequency-domain sub-symbols $x_{1,k}$ and $x_{2,k}$, thereby producing two sequences of frequency components $y_{1,k}$ and $x_{2,k}'$, respectively, which are corrected for carrier frequency offset;
  b) removing the differential modulation on the second set of frequency components $x_{2,k}'$ to obtain a non-differentially modulated second set of frequency components, $y_{2,k}$;
  c) computing an estimated value for the phase rotation, $\theta$, of the first sub-carrier during a symbol-plus-guard interval, $T_s+T_g$, according to the equation:

$$\Phi = \frac{\sum_{k \in x} \text{angle}(y^*_{1,k} y_{2,k}) |y^*_{1,k} y_{2,k}|^2 k}{\sum_{k \in x} |y^*_{1,k} y_{2,k}|^2 k^2}$$

or an equivalent thereof, said phase rotation corresponding to said sampling frequency offset according to the equation:

$$\theta = 2\pi \cdot \Delta t / T_s$$

and $$f_{ck} = f_{ck} \Delta t / (T_s + T_g)$$

wherein $\Delta t$ is a sampling time error that accumulates in a time $T_s+T_g$ due to said sampling frequency offset; whereby said receiver estimates the sampling rate offset, thereby enabling said receiver to achieve sampling rate synchronization and thereby avoid an increase in BER due to said sampling frequency offset as said receiver demodulates said OFDM signal to recover data encoded thereon.

24. The apparatus of claim 22 wherein said OFDM signal has a sampling rate offset of $\Delta f_{ck}$, the apparatus further comprising a computing means for performing the following computations in order to estimate said sampling rate offset:
  a) removing said whole number part of the estimated carrier frequency offset from said frequency-domain sub-symbols $x_{1,k}$ and $x_{2,k}$, thereby producing two sequences of frequency components $y_{1,k}$ and $x_{2,k}'$, respectively, which are corrected for carrier frequency offset;
  b) removing the differential modulation on the second set of frequency components $x_{2,k}'$ to obtain a non-differentially modulated second set of frequency components, $y_{2,k}$;
  c) computing an estimated value for the phase rotation, $\theta$, of the first sub-carrier during a symbol plus guard interval, $T_s+T_g$, according to the equation:

$$\Phi = \frac{\sum_{k \in x} \text{angle}(y^*_{1,k} y_{2,k}) |y^*_{1,k} y_{2,k}|^2 k}{\sum_{k \in x} |y^*_{1,k} y_{2,k}|^2 k^2}$$

or equivalent thereof, said phase rotation corresponding to said sampling frequency offset according to the equation:

$$\theta = 2\pi \cdot \Delta t / T_s$$

and $$\Delta f_{ck} = f_{ck} \Delta t / (T_s + T_g)$$

wherein $\Delta t$ is the sampling time error that accumulates in a time $T_s+T_g$ due to said sampling frequency offset; whereby said receiver estimates the sampling rate offset, thereby enabling said receiver to achieve sampling rate synchronization and thereby avoid an increase in BER due to said sampling frequency offset as said receiver demodulates said OFDM signal to recover data encoded thereon.

25. The apparatus of claim 23 wherein said odd-numbered sub-carriers of said second OFDM training symbol are modulated by a predetermined third PN sequence of OFDM frequency-domain sub-symbols, said third PN sequence used for channel estimation of said odd-numbered sub-carriers.

26. The apparatus of claim 24 wherein said odd-numbered sub-carriers of said second OFDM training symbol are modulated by a predetermined third PN sequence of OFDM frequency-domain sub-symbols, said third PN sequence used for channel estimation of said odd-numbered sub-carriers.

* * * * *